(12) United States Patent
Kothandaraman et al.

(10) Patent No.: US 7,657,887 B2
(45) Date of Patent: Feb. 2, 2010

(54) SYSTEM FOR TRANSACTIONALLY DEPLOYING CONTENT ACROSS MULTIPLE MACHINES

(75) Inventors: Vijayakumar Kothandaraman, Cupertino, CA (US); William G. Cuan, Sunnyvale, CA (US); Todd Scallan, Los Gatos, CA (US)

(73) Assignee: Interwoven, Inc., Sunnyvale, CA (US)

(*) Notice: Subject to any disclaimer, the term of this patent is extended or adjusted under 35 U.S.C. 154(b) by 425 days.

(21) Appl. No.: 11/000,573

(22) Filed: Nov. 30, 2004

(65) Prior Publication Data

US 2005/0080801 A1 Apr. 14, 2005

Related U.S. Application Data

(63) Continuation-in-part of application No. 09/860,893, filed on May 17, 2001, now abandoned.

(60) Provisional application No. 60/205,805, filed on May 17, 2000.

(51) Int. Cl.
*G06F 9/44* (2006.01)
*G06F 9/445* (2006.01)
*G06F 9/46* (2006.01)

(52) U.S. Cl. ............ 717/176; 717/174; 717/170

(58) Field of Classification Search ............ 709/201, 709/223, 238, 248, 249, 200; 717/176, 177, 717/178, 171, 170, 174; 719/311, 312, 313, 719/318, 319, 320, 310, 328, 330; 713/152, 713/164, 165, 166, 167
See application file for complete search history.

(56) References Cited

U.S. PATENT DOCUMENTS 5,008,853 A 4/1991 Bly et al.
5,220,657 A 6/1993 Bly et al.

(Continued)

FOREIGN PATENT DOCUMENTS

EP 0 229 232 7/1987

(Continued)

OTHER PUBLICATIONS

Agrawal et al."Modular Synchronization in Distributed, Multiversion Databases: Version Control and Concurrency Control". IEEE, vol. 5, No. 1, Feb. 1993, p. 126-127.*

(Continued)

*Primary Examiner*—Li B Zhen
(74) *Attorney, Agent, or Firm*—Michael A. Glenn; Glenn Patent Group

(57) ABSTRACT

A system for transactionally deploying content across multiple machines in a network environment automates and synchronizes secure and reliable distribution of digital assets to multiple network locations, allowing controlled provisioning and synchronization of code and content updates to live applications. A distributed architecture includes at least one receiver—a secure listener configured to process incoming distribution jobs—and at least one base server—a sender that may also act as a receiver. An administration interface allows administrative and reporting services and deployment management. Using the administrative interface, users are enabled to launch, simulate, schedule and monitor activities for any network location at any time. The system provides fan-out and multi-tiered deployment topologies expandable to hundreds of servers. Each deployment is fully transactional, permitting rollback of the system to it "last known good" state in the case of failure.

88 Claims, 13 Drawing Sheets

U.S. PATENT DOCUMENTS

| | | | |
|---|---|---|---|
| 5,515,491 | A | 5/1996 | Bates et al. |
| 5,555,371 | A | 9/1996 | Duyanovich et al. |
| 5,557,737 | A | 9/1996 | Wilhite et al. |
| 5,675,802 | A | 10/1997 | Allen et al. |
| 5,694,601 | A | 12/1997 | White |
| 5,754,845 | A | 5/1998 | White |
| 5,764,977 | A * | 6/1998 | Oulid-Aissa et al. .......... 707/10 |
| 5,784,548 | A | 7/1998 | Liong et al. |
| 5,819,089 | A | 10/1998 | White |
| 5,835,712 | A | 11/1998 | DuFresne |
| 5,835,757 | A * | 11/1998 | Oulid-Aissa et al. .......... 707/10 |
| 5,854,930 | A | 12/1998 | McLain et al. |
| 5,857,204 | A * | 1/1999 | Lordi et al. ................. 707/202 |
| 5,895,476 | A | 4/1999 | Orr et al. |
| 5,896,530 | A | 4/1999 | White |
| 5,897,638 | A * | 4/1999 | Lasser et al. ................. 707/102 |
| 5,913,029 | A | 6/1999 | Shostak |
| 5,937,409 | A * | 8/1999 | Wetherbee .............. 707/103 R |
| 5,958,008 | A | 9/1999 | Pogrebisky et al. |
| 5,983,268 | A | 11/1999 | Freivald et al. |
| 6,018,747 | A | 1/2000 | Burns et al. |
| 6,052,695 | A * | 4/2000 | Abe et al. .................... 707/202 |
| 6,088,693 | A | 7/2000 | Van Huben et al. |
| 6,088,717 | A | 7/2000 | Reed et al. |
| 6,098,091 | A | 8/2000 | Kisor |
| 6,112,024 | A * | 8/2000 | Almond et al. ............. 717/122 |
| 6,115,710 | A | 9/2000 | White |
| 6,115,711 | A | 9/2000 | White |
| 6,151,609 | A | 11/2000 | Truong |
| 6,178,439 | B1 | 1/2001 | Feti |
| 6,195,353 | B1 * | 2/2001 | Westberg ................. 370/230.1 |
| 6,195,760 | B1 | 2/2001 | Chung et al. |
| 6,209,007 | B1 | 3/2001 | Kelley et al. |
| 6,216,212 | B1 | 4/2001 | Challenger et al. |
| 6,219,818 | B1 | 4/2001 | Freivald et al. |
| 6,226,372 | B1 * | 5/2001 | Beebe et al. ................. 379/189 |
| 6,230,185 | B1 | 5/2001 | Salas et al. |
| 6,233,600 | B1 | 5/2001 | Salas et al. |
| 6,240,414 | B1 | 5/2001 | Beizer et al. |
| 6,240,444 | B1 | 5/2001 | Fin et al. |
| 6,256,740 | B1 * | 7/2001 | Muller et al. ................. 726/12 |
| 6,330,594 | B1 * | 12/2001 | Swart ......................... 709/219 |
| 6,339,832 | B1 * | 1/2002 | Bowman-Amuah .......... 714/35 |
| 6,421,676 | B1 * | 7/2002 | Krishnamurthy et al. .... 707/102 |
| 6,434,568 | B1 * | 8/2002 | Bowman-Amuah ..... 707/103 R |
| 6,452,612 | B1 | 9/2002 | Holtz et al. |
| 6,507,863 | B2 * | 1/2003 | Novaes ....................... 709/201 |
| 6,546,545 | B1 * | 4/2003 | Honarvar et al. ............ 717/100 |
| 6,606,744 | B1 | 8/2003 | Mikurak |
| 6,640,244 | B1 | 10/2003 | Bowman-Amuah |
| 6,646,989 | B1 * | 11/2003 | Khotimsky et al. ......... 370/238 |
| 6,662,357 | B1 | 12/2003 | Bowman-Amuah |
| 6,701,345 | B1 | 3/2004 | Carley |
| 6,715,145 | B1 | 3/2004 | Bowman-Amuah |
| 6,728,715 | B1 * | 4/2004 | Astley et al. ................... 707/10 |
| 6,732,189 | B1 * | 5/2004 | Novaes ....................... 709/249 |
| 6,839,803 | B1 * | 1/2005 | Loh et al. .................... 711/113 |
| 7,051,365 | B1 * | 5/2006 | Bellovin ...................... 726/11 |
| 7,315,826 | B1 * | 1/2008 | Guheen et al. ................ 705/7 |
| 2001/0010046 | A1 | 7/2001 | Muyres et al. |
| 2001/0011265 | A1 | 8/2001 | Cuan et al. |
| 2001/0027457 | A1 | 10/2001 | Yee |
| 2001/0039594 | A1 | 11/2001 | Park et al. |
| 2001/0044834 | A1 | 11/2001 | Park et al. |
| 2002/0004824 | A1 | 1/2002 | Cuan et al. |
| 2002/0010798 | A1 | 1/2002 | Ben-Shaul et al. |
| 2002/0048260 | A1 * | 4/2002 | Iidaka ......................... 370/242 |
| 2002/0055928 | A1 | 5/2002 | Worthington |
| 2002/0152173 | A1 | 10/2002 | Rudd |
| 2002/0165977 | A1 * | 11/2002 | Novaes ....................... 709/238 |
| 2002/0178214 | A1 | 11/2002 | Brittenham et al. |
| 2002/0178244 | A1 | 11/2002 | Brittenham et al. |
| 2002/0178254 | A1 | 11/2002 | Brittenham et al. |
| 2002/0194483 | A1 | 12/2002 | Wenocur et al. |
| 2002/0199014 | A1 | 12/2002 | Yang et al. |
| 2003/0051066 | A1 | 3/2003 | Pace et al. |
| 2003/0051236 | A1 | 3/2003 | Pace et al. |
| 2003/0078958 | A1 | 4/2003 | Pace et al. |
| 2003/0120593 | A1 | 6/2003 | Bansal et al. |
| 2003/0172135 | A1 | 9/2003 | Bobick et al. |
| 2004/0003400 | A1 | 1/2004 | Carney et al. |
| 2004/0015408 | A1 | 1/2004 | Rauen, IV et al. |
| 2004/0054787 | A1 | 3/2004 | Kjellberg et al. |
| 2004/0064351 | A1 | 4/2004 | Mikurak |
| 2007/0074293 | A1 * | 3/2007 | Ushimaru ..................... 726/26 |

FOREIGN PATENT DOCUMENTS

| | | |
|---|---|---|
| EP | 0 621 528 | 10/1994 |
| EP | 1292144 | 3/2003 |

OTHER PUBLICATIONS

Verharen,E.M.; *Streaming Technologies: Under the Hood*; May 2000; Terena Networking Conference 2000. 'Pioneering Tomorrow's Internet' Abstracts p. 1; Terena; Netherlands.

Bohannon, P. et al.; *The Architecture of the Dali Main-Memory Storage Manager*; Mar. 1997; Kluwer Academic Publishers, Boston.

Chandra, S. et al.; *Application-Level Differentiated Multimedia Web Services Using Quality Aware Transcoding*; Dec. 2000; Department of Computer Science, Duke University, Durham, NC; IEEE Special Issue on QOS in the Internet, vol. 18, No. 12.

*Wireless Application Protocol Architecture Specification*; Apr. 1998; WAP Architecture, Version Apr. 30, 1998.

Huck, G. et al.; *Integration and Handling of Hypermedia Information as a Challenge for Multimedia and Federated Database Systems*; Jun. 1995; GMD - Integrated Publication and Information Systems Institute (IPSI); Germany.

Marshall, I. et al.; *Alpine - Application Level Programmable Inter-Network Environment*; Apr. 1999.

Vieregger, C.; *A Peck of Java Portlets*; Mar. 2003; Software Development, vol. 11, No. 3, CMP Media Inc.; USA. abstract, 1 page.

Stratigos, A. et al.; *Library of the Future*;Jan. - Feb. 2003; Online vol. 27, No. 1 Online Inc.; USA. abstract,2 pages.

Tong Zheng et al.; *WebFrame: In Pursuit of Computationally and Cognitively Efficient Web Mining*; May 2002; Advances in Knowledge Discovery and Data Mining. 6th Pacific-Asia Conference, PAKDD 2002. Proceedings (Lecture Notes in Artificial Intelligence vol. 2336) Springer-Verlag; Germany. abstract, 2 pages.

Wen-Syan Li et al.; *Engineering High Performance Database-Driven E-Commerce Web Sites through Dynamic Content Caching*; Sep. 2001; Electronic Commerce and Web Technologies. Second International Conference, EC-Web 2001. Proceedings (Lecture Notes in Computer Science vol. 2115) Springer-Verlag; Germany. abstract, 1 page.

*Content Management Goes Modular*; Feb. 11, 2002; Information Week No. 875; CMP Media Inc., USA. abstract, 2 pages.

Lili Qiu e tal.; *On the Placement of Web Server Replicas*;Apr. 2001; Proceedings IEEE Infocom 2001. Conference on Computer Communications. Twentieth Annual Joint Conference of the IEEE Computer and Communications Society (Cat. No.01CH37213) vol. 36; IEEE, Piscataway, NJ, USA. abstract, 2 pages.

Christodoulou, S.P. et al.; *Web Engineering: The Developers' View and a Practitioner's Approach*; 2001; Web Engineering. Managing Diversity and Complexity of Web Application Development; Springer-Verlag; Germany abstract, 1 page.

Burns, R.C. et al.; *Efficient Data Distribution in a Web Server Farm*; Jul. - Aug 2001; IEEE Internet Computing vol. 5, No. 4; IEEE;USA. abstract, 1 page.

Chu-Sing Yang et al.; *Efficient Support for Content-Based Routing in Web Server Clusters*; Oct. 1999; 2nd USENIX Symposium on Internet Technologies and Systems; USENIX Assoc., Berkeley, CA, USA. abstract ,2 pages.

Wagner, R.E.; *Television Program Content Management: Engineering and Deployment*; Jun. 2000; Fernseh- und Kino- Technik vol. 54, No. 6 Germany. abstract, 1 page.

Chu-Sing Yang et al.; *An Effective Mechanism for Supporting Content-Based Routing in Scalable Web Server Clusters*; Sep. 1999; Proceedings of the 1999 ICPP Workshops on Collaboration and Mobile Computing (CMC'99). Group Communications (IWGC). Internet '99 (IWI'99). Industrial Applications on Network Computing (INDAP). Multimedia Network Systems (MMNS). Security (IWSEC). Parallel Computing '99 (IWPC'99). Parallel Execution on Reconfigurable Hardware (PERH); IEEE, Los Alamitos, CA, USA. abstract, 2 pages.

Liew, S.C. et al.; *Intellect: A System for Authoring, Disturbing, and Presenting Multimedia Contents Over the Internet*; Jun. 1999; Proceedings IEEE International Conference on Multimedia Computing and Systems vol. 2; IEEE Comput. Soc, Los Alamitos, CA, USA. abstract, 2 pages.

\* cited by examiner

SYSTEM FOR TRANSACTIONALLY DEPLOYING CONTENT ACROSS MULTIPLE MACHINES

CROSS-REFERENCE TO RELATED APPLICATIONS

This Application is a Continuation-in-part of U.S. patent application Ser. No. 09/860,893 filed May 17, 2001 now abandoned, which claims benefit of U.S. Provisional Patent Application Ser. No. 60/205,805, filed May 17, 2000.

BACKGROUND OF THE INVENTION

1. Technical Field

The invention relates generally to multi-computer transfer of data. More particularly the invention relates to transactional deployment of data across multiple machines.

2. Description of Related Art

Today's economic pressures are forcing IT management to identify and eliminate redundant, customized, inefficient processes that exist within their businesses. One area of inefficiency that has been discovered in today's increasingly complex web-based application environment is the code and content distribution process.

Hidden within nearly every web application, from development, through QA, to a live, production environment is a set of manually developed distribution processes that are often unsecured, expensive to maintain, and difficult to scale.

Home-grown distribution processes are typically based on FTP (file transfer protocol), a mechanism for exchanging files between servers over the Internet. For example, J. White, Portable and dynamic distributed transaction management method, U.S. Pat. No. 6,115,710 (Sep. 5, 2000) describes a distributed application architecture that includes a user interface for use by an application developer to construct executable application load modules for each system on which an application will reside. Transfer of load modules occurs by way of a conventional FTP (file transfer protocol) application. Although FTP is an ideal point-to-point utility, the tool must be configured or customized each time a new target destination or content origination point is identified. This customization can be labor-intensive, and in the long run, it drives up the total cost of ownership of any web-based application relying on FTP for distribution because of the need to manage and maintain each customization individually.

The Open Source movement has generated a handful of tools to help address the distribution challenge. RSYNC, a utility providing fast, incremental file transfer, is one such tool. While RSYNC is a more sophisticated tool than standard FTP, it lacks built-in encryption and authorization to meet security requirements; it does not provide an easy means of integrating the distribution process with other applications, and it is difficult to scale.

Software products also often come with some minimal set of proprietary distribution tools. One example is the SITE-SERVER product (MICROSOFT CORPORATION, Redmond Wash.), which featured CONTENT REPLICATION SERVER (CRS) technology. Technologies such as CRS offer adequate distribution capacity within their respective environments, but they offer little value in distributed, multi-application and multi-platform environments The art provides additional examples of content distribution. For example, M. Muyres, J. Rigler, J. Williams, Client content management and distribution system, United States Patent Application Pub. No. US 2001/0010046 (filed Mar. 1, 2001, published Nov. 28, 2002) describe a digital content vending machine and methods for distributing content to and managing content on the machine. What is described is an e-commerce application wherein single copies of selected digital assets are distributed to single clients in response to a purchase request from a user.

P. Brittenham, D. Davis, D. Lindquist, A. Wesley, Dynamic deployment of services in a computing network, United States Patent Application Pub. No. US 2002/0178254 (filed May 23, 2001, published Nov. 28, 2002) and P. Brittenham, D. Davis, D. Lindquist, A. Wesley, Dynamic redeployment of services in a computing network, United States Patent Application Pub. No. US 2002/0178244 (filed May 23, 2001, published Nov. 28, 2002) describe methods and systems for dynamically deploying and redeploying services, such as web services, in a computer network. Conditions such as usage metrics for incoming requests are used to trigger dynamic deployment of web services to locations in the network to improve network efficiency.

C. Pace, P. Pizzorni, D. DeForest, S. Chen, Method and system for deploying an asset over a multi-tiered network, United States Patent Application Pub. No. US 2003/0051066 (filed Sep. 4, 2001, published Mar. 13, 2003) and C. Pace, P. Pizzorni, D. DeForest, S. Chen, Method and system for deploying an asset over a multi-tiered network, United States Patent Application Pub. No. US 2003/0078958 (filed Sep. 4, 2001, published Apr. 24, 2003) describe a system for deploying digital assets wherein an asset may represent network and/or application components (e.g., data, objects, applications, program modules, etc.) that may be distributed among the various resources of the network. In one embodiment, a target node's environment may be adjusted before an asset is deployed to that target node. In an alternative embodiment, a target deployment adapter, associated with the asset, may be selected and deployed with the asset in order to allow the asset to operate in the target node environment.

While the above examples describe various aspects of content distribution, none contemplates automated, transactional distribution of any type of digital asset in which assets managed in any type of repository or file system are deployed to all touch points across an enterprise. Furthermore, none contemplate parallel deployments, routed deployments, multi-tiered deployments and reverse deployments. None contemplates security options that include security of communications between machines and data integrity.

Thus, there exists a need in the art for an efficient means of content distribution that disseminates the appropriate content to the right parties and places at the right time. It would be advantageous for such to maintain integrity of the deployed content by keeping content synchronized while distributing from multiple management systems to multiple network destinations in parallel, routed, multi-tiered and reverse deployments. It would also be advantageous if such were scalable and capable of protecting the deployed content from unauthorized access.

SUMMARY OF THE INVENTION

Therefore, in recognition of the above needs, the invention provides a system for transactionally deploying content across multiple machines in a network environment that automates and synchronizes the secure and reliable distribution of code, content and configurations to multiple network locations, thereby allowing controlled provisioning and synchronization of code and content updates to live applications.

The invented system employs an open, distributed architecture that includes at least one receiver—a secure listener that processes incoming deployments from one or more senders, and at least one base server—a sender that may also act as a receiver. By using such architecture, the invention is able to deploy digital assets managed in any repository or file system to any type of network touch point—file servers, application servers, databases, and edge devices. Use of a base server as a receiver facilitates multi-tiered deployments.

The invention additionally includes an administration interface to be installed on a network-accessible system to provide administrative and reporting services and management of the deployment process. Using the administrative interface, users are enabled to launch, simulate, schedule and monitor activities for any network location at any time. A command line interface and web-services API (application programming interface) enable programmatic initiation of system functions. The invention also provides for management of user rights with fine granularity.

The invention supports ECD (enterprise content deployment) with fan-out, multi-tiered and routed deployment topologies capable of including hundreds of servers. The invented system also provides a variety of content manipulation features and is optimized to deliver only the delta changes between a source and each target. The invented system is scalable, allowing server farms to be added incrementally as the network infrastructure changes and develops. Each deployment is fully transactional, permitting rollback of the system to its "last known good" state in the case of failure.

DETAILED DESCRIPTION

The following detailed description should be read with reference to the drawings. The drawings depict illustrative embodiments that are not intended to limit the scope of the invention.

Figure 1:
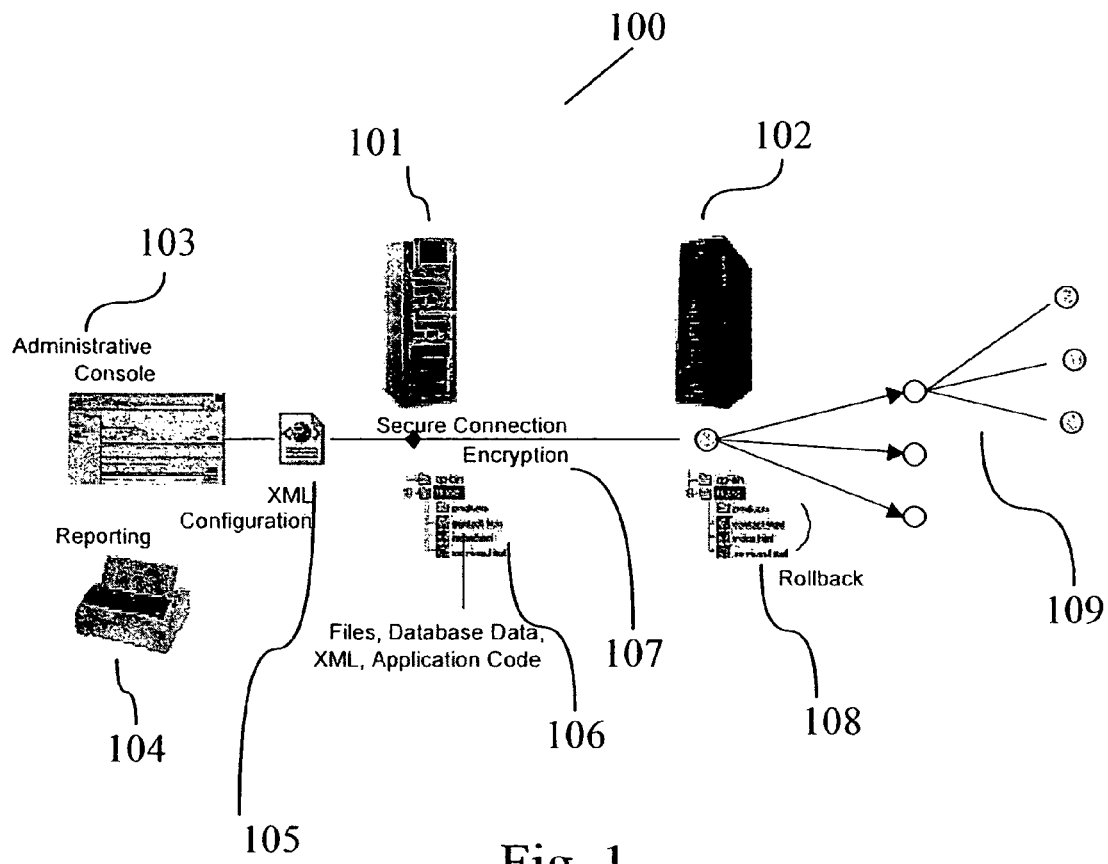
FIG. 1 provides an architecture diagram of a system for transactionally deploying content across multiple machines according to the invention.

The invention provides a system for the cross-platform, transactional transfer of code, content and configurations to multiple machines. As shown in FIG. 1, the system architecture 100 supports enterprise distribution and automates the deployment process, while providing a high degree of flexibility and administrative control. Advantageously, the system easily integrates with any code or content management system, thus making content distribution a natural extension of established business processes. An open architecture enables the invention to distribute assets managed in any repository or file system to all network touch points found in today's IT environments, including file servers, application servers, databases and edge devices. The system includes one or more senders 101 and one more receivers 102. In a preferred embodiment, a base server fulfills the role of sender. The base server is configured to both send content and to receive. The receiver is a secure listener configured to process incoming distribution jobs. An administrative console 103 allows administrative and reporting services and deployment management. At the administrative console, configuration files 105 are created, edited and managed and distributed throughout the enterprise as needed.

As previously described, content 106 refers to any digital asset of an enterprise, including, but not limited to:
files;
database data;
XML;
media; and
application code.

The distribution architecture 100 retrieves content and facilitates any necessary transformations as it is distributed along the way. The administration console 103 is used to administer distribution modules 109, base servers, and or receivers, residing across the network. The administration console also incorporates a reporting and auditing module 104. Security features 107, including encryption of deployed content and secure connections safeguard an enterprise's digital assets against unauthorized access. Deployment processes are fully transactional, permitting rollback 108 of the system and the content to its last known good state in case a deployment fails. More will be said about each of the above system elements in the paragraphs below.

The system facilitates mission-critical processes within IT operations throughout the enterprise including:

Enterprise content distribution: Universal distribution of all content types;

Web change management: Controlled provisioning of code, content and configuration updates to web applications;

Deployments from Interwoven ECM: Intelligent, automated content distribution, web publishing and syndication enterprise content management (ECM) systems.

The content deployment system enables IT organizations to:

substantially reduce distribution costs;

automate inefficient distribution processes;

securely synchronize updates and automate rollback; and maintain audit trail for all changes.

Figure 2:
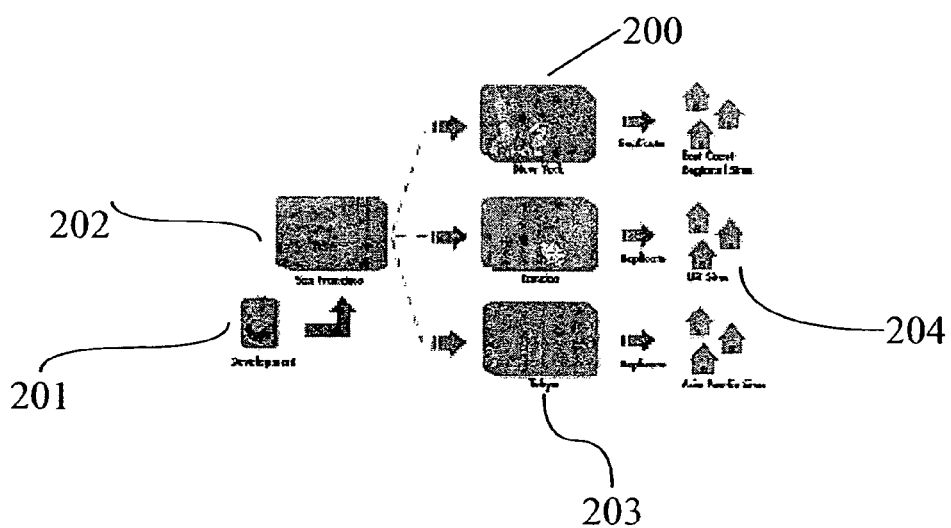
FIG. 2 provides a flow diagram of an exemplary network topology from the system of FIG. 1 according to the invention.

FIG. 2 provides a flow diagram of an exemplary network topology from the invented system. Illustrated is a case wherein code and content 201 is being developed in San Francisco. From a hub system in San Francisco 202, the content is distributed to a hub at each of three geographically dispersed sites 203-New York, London and Tokyo. From there, the system replicates updates to regional targets 204. If the assets to be distributed reside in a repository, such as a software configuration or content management system, the system can access the assets directly through the file system or by automatically invoking an appropriate export facility. The distribution environment may be as simple or sophisticated as required by the implementer. Systems may include a mix of, for example, WINDOWS and UNIX platforms, or other computing platforms, such as APPLE or VMS. Additionally, the invention is applicable in a wide variety of distributed computing environments, either homogenous or heterogeneous. As shown, each system that participates in the distribution environment runs a receiver, for example the regional targets 204, or a base server; the hubs 201, 202 for example.

The system delivers value both to the administrator who sets up and manages the deployment environment and the user who submits deployment jobs. The administrator uses the administrative console, by means of a browser-based Administrative UI (user interface), described in greater detail below, to assign users and authorizations to the system. Also by means of the Admin UI, an administrator also configures base servers, receivers and deployment rules via XML (extensible markup language) files. A user may then log in and initiate or schedule deployment jobs.

Open Content Deployment Protocol

Figure 3:
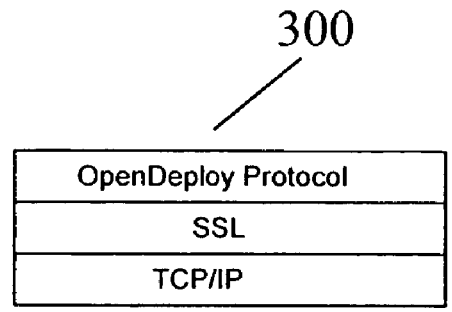
FIG. 3 shows a stack diagram of an open content deployment protocol incorporated from the system of FIG. 1 according to the invention.

In its preferred embodiment, the invention employs a connection-oriented protocol that defines how senders and receivers transfer content and communicate status information. As shown in the protocol stack 300 of FIG. 3, the underlying base transport protocol is TCP/IP. When configured for high encryption operation, the Content deployment protocol sits above the SSL (Secure Sockets Layer) protocol.

The open content deployment protocol consists of a series of handshakes and operation directives that are exchanged between the sender and receiver. Once a connect session is established, the sender pushes over the configuration parameters for the deployment. The receiver, with this session information in hand, executes the deployment accordingly.

Deployment Types

The type of deployment determines the behavior of the receiver and which options and functionality to activate and execute. The three types of deployment are described below.

Content management: In a content management deployment, content from the content management server is pushed over to the receiver. The receiver operates in passive mode;

File list: In a file list-based deployment, files and/or directories are pushed over to the receiver. The receiver operates in passive mode; and Directory comparison. In a directory comparison deployment, the source-side directory information is sent over to the receiver. The receiver compares the source side directory information against the target-side directory information to determine what content needs to be transferred.

Transactional Deployment

As described above, the invention provides a transactional deployment option that maintains the previous state of the destination directory, in case the currently-initiated deployment, for any reason, fails. The deployed files are staged in the destination directory while a shadow copy of the original content is created for rollback upon failure. This shadow copy is created per content item (file/directory) as the deployment progresses. Thus, if a rollback is required, only the files that have been deployed so far are reverted. The rest of the content remains untouched.

Reverse Deployment

The deployments described earlier are considered "push" deployments. The invention also allows reverse deployments, in which content is "pulled" from a remote directory.

Authentication

The invention's authentication options ensure that communication occurs with a known machine in a known manner and that data is received directly from the known machine without interception by a third party. The types of authentication are described below:

Authentication by IP address. The invention can be configured to work with a firewall to ensure that the receiver is communicating with a known machine in a known manner. The receiver can be configured to listen on a specific port for connection attempts by the firewall's specific IP address. The receiver can be further configured to receive content only from a known, trusted source.

Authentication by SSL certificate. The invention can be configured to work with SSL certificates to ensure that data is received directly from a known machine without any interception by a third party. An affiliated Certificate Authority (CA) generates public key/private key pairs for both sender and receiver.

Service-Oriented Architecture

Figure 4:
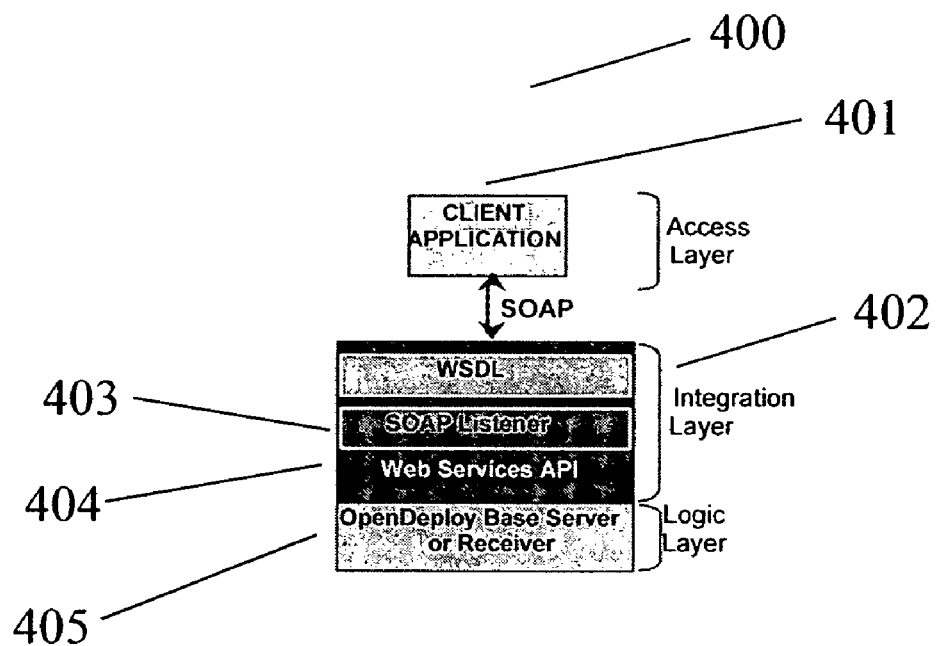
FIG. 4 shows a stack diagram of a service-oriented architecture from the system of FIG. 1 according to the invention.

A service-oriented architecture 400 is designed to enable a loose coupling between interacting software agents. FIG. 4 provides a stack diagram of a service-oriented architecture according to the invention. The invention includes a SOAP—(simple object access protocol) based interface 403 that provides programmatic access to the various functions and capabilities of the system. A language-neutral, firewall-friendly API 404 exposes web services, such as starting a deployment or retrieving the status of a deployment 405, using standard WSDL (web services description language) 402.

Adaptive Architecture

The invention provides a programmatic infrastructure to broaden applicability of content distribution and web change provisioning within diverse computing environments. Elements of such architecture include:

Payload adapters: A Base Server can be integrated with an arbitrary source or metadata repository via a payload adapter, which is executed in process at the start of a deployment job. A parameter string or XML-based query is passed to the adapter from the deployment configuration file, described in more detail below. The adapter prepares a payload of files, which is returned to the Base Server, compared with the targets, and deployed or deleted as appropriate.

Delivery adapter: Deployments may include delivery adapters, which extend the invention to any target application server, protocol or device. After files are deployed to a target Base Server, a delivery adapter is invoked in process with a manifest of deployed files. The adapter then processes the files; for example, by pushing new content into a set of cache servers.

Routing adapter: Routed deployments (described infra) rely on an adapter for computing multi-tiered delivery routes for deployed files.

Enterprise Scalability

Figure 5:
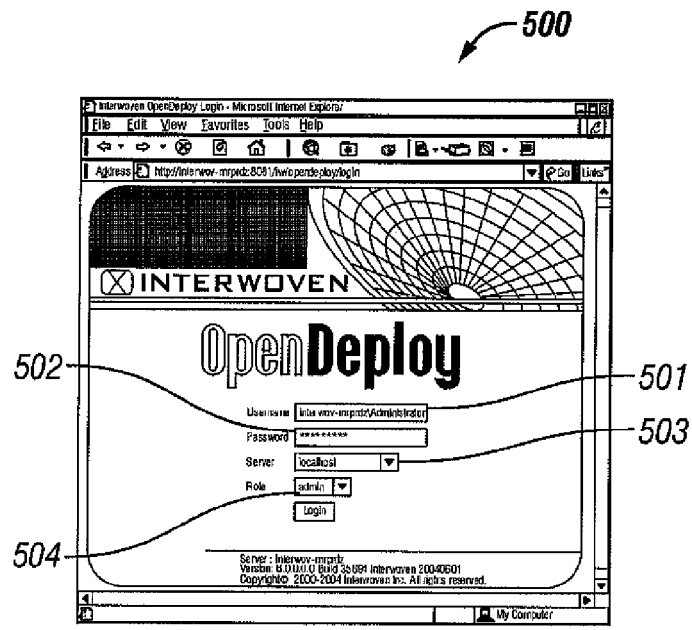
FIG. 5 provides a screenshot of a login screen to the system of FIG. 1 according to the invention.

The invention supports enterprises with multi-tiered deployment topologies consisting of tens or hundreds of servers inside and outside firewalls. Deployments are optimized to distribute only the incremental changes between a source and each target. Servers can be added as initiatives grow, which affords a solution that is readily adapted to a continually changing IT infrastructure. Moreover, cross-version compatibility and the ability to run multiple instances of the invention on a host provide a capability of phased upgrades in production environments Services FIG. 5 provides a screenshot of a login screen 500 to the system of FIG. 1. In one embodiment of the invention, during authentication, a user is asked to provide a user name 501, password 502, to select a server from a menu 503, and to specify the user's role 504, for example 'user' or 'administrator.' The preceding description is meant only to be illustrative. Other authentication processes are entirely consistent with the spirit and scope of the invention.

Browser-Based User Interface (UI)

A browser-based UI 600 grants ready access to all major system functions and processes, thus streamlining administration and execution of the distribution process. In addition, a command line interface and web services API (application programming interface), described in greater detail below, are also available for authoring automated scripts to initiate system functions.

Administrators can take advantage of the browser-based Administrative UI to set up the environment and monitor activities anywhere at any time. Users also benefit from the Admin UI, which makes launching, simulating and scheduling distribution jobs quick and easy. The Admin UI lets administrators and users work from anywhere across the network. A person logging into the system is authenticated using the username and password for the underlying operating system or user directory.

The Administrative UI includes a navigation tree 601 that grants access to a number of functional areas. In certain embodiments these functional areas may include, as shown:

Deployments: start deployments; view deployment status and results;

Schedules: create and view schedule entries for automatic deployments;

Configurations: view, edit and upload deployment configurations;

Servers: view and manage base Servers and receivers;

Reports: create and run deployment report queries; view or download reports;

User Access: assign access rights to base servers and receivers; restrict users' ability to initiate deployments;

Database auto-synchronization: Configure database auto-synchronization for content from content management systems;

Syndication: Manage syndicated content offers and subscriptions.

Figure 6:
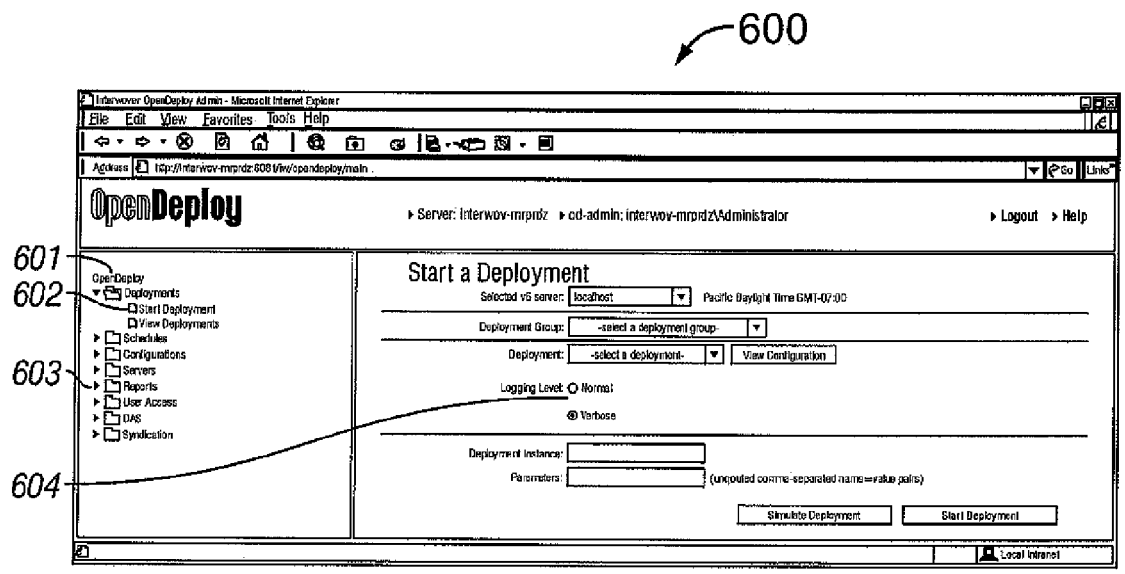
FIG. 6 provides a screen shot of an administrative user interface (UI) to the system of FIG. 1 according to the invention.
Figure 7:
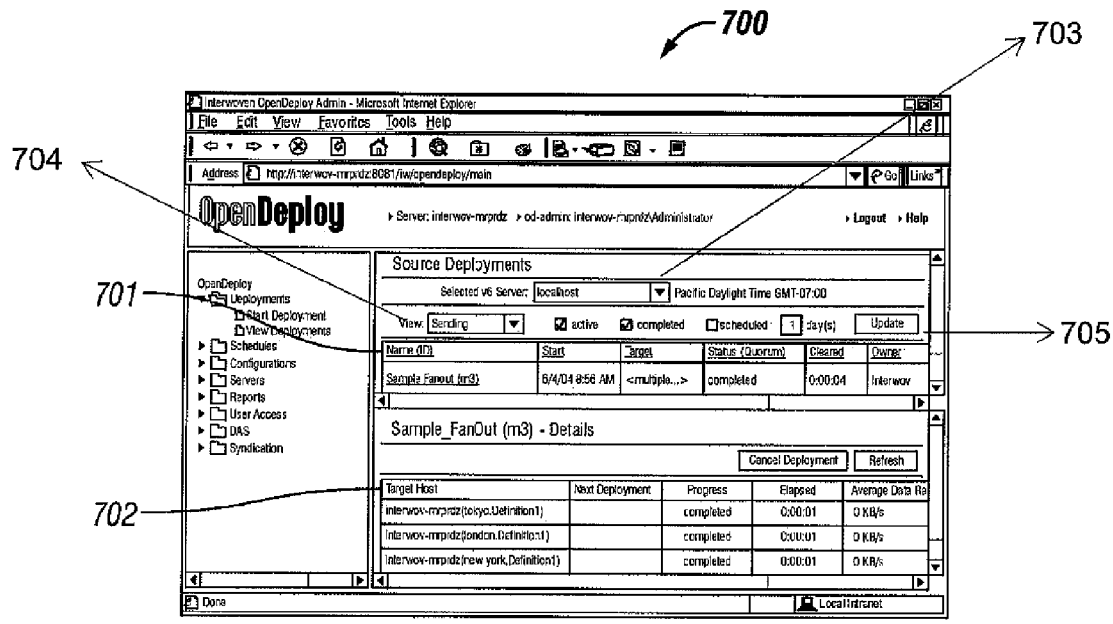
FIG. 7 provides a screen shot of a user interface for managing deployments from the administrative UI of FIG. 6 according to the invention.

The main work area of the Administrative UI displays details and functions related to the functional area selected in the navigation tree. As shown in FIG. 6, the 'deployment' functional area 602 is selected. Thus, the main work area of the UI provides details and functions 604 related to 'deployments.' Arrows 603 allow the user to expand or contract each functional branch of the navigation tree 601 with a mouse-click.

Online Deployment Management

Users can run or simulate deployments directly through the Admin UI. In running a deployment the user initiates a job that is specified based on the particular deployment configuration selected. The process of creating a deployment configuration is described in greater detail below. Simulation is similar to running a deployment, except that no files are transferred, which allows a user to verify the behavior of a deployment configuration quickly without moving potentially many megabytes of data.

As shown in FIG. 6, running a deployment involves expanding 'Deployments' in the navigation tree 601 and selecting 'Start Deployment.' Starting a deployment includes the following steps:

Choosing the server from which the deployment is to be initiated; for example, localhost (as shown)'

Selecting a deployment group: deployments can be organized into groups. The user selects a deployment group from the list; for example, the root level group (/);

Deployment: The user selects a deployment configuration from a list; for example, 'test.' The deployment configuration is an XML file that specifies deployment rules, such as the source area, the target and filters. Additional parameters may be specified.

Logging Level: either Normal or Verbose.

Deployment Instance: A unique name for a deployment job.

Parameters: Key-value pairs to be used in a deployment that has been configured for parameter substitution.

After clicking the 'Start Deployment' button, the UI indicates that the deployment has started and provides details; for example, job ID and start time. By selecting 'View Deployments' in the navigation tree the user is presented an interface 700 that allows monitoring of the status of the deployment that is currently executing.

Selected server 703: the value previously selected, e.g. 'localhost.'

View 704: Indicates whether to look at the server as sending or receiving. (A base server can be both a sender and receiver, such as a hub node in a multi-tiered deployment or when performing a loop-back deployment.)

Check boxes 705: These allow the user to filter which jobs to view: for example 'active,' 'completed' and 'scheduled,' including how many days ahead to look. An 'Update' button 506 refreshes the display after making a change.

Deployments list 701: A deployments lists displays deployments for the selected server. The list is filtered according to the view and check boxes described above. Clicking the column headings to changes the sort order;

Details list 702: Clicking on a Name (ID) in the Deployments list updates the details list with details about each deployment leg. For example, a parallel deployment to New York, London and Tokyo would have three legs.

In addition, the command line tool, mentioned above, may be used instead of the Administrative UI to initiate deployments.

Job Scheduler

A built-in scheduler 800 allows users to schedule jobs once or at recurring intervals. Jobs may be scheduled, deactivated and reactivated from the Administrative UI using the job scheduler. To schedule a job, the user Expands 'Schedules' in the navigation tree 601 and selects 'New Schedule'. The work area of the UI shows the 'Scheduler' details 801, as in the 'Deployments' interface. Scheduling includes the following steps:

Selecting Server, deployment group, deployment: Server, deployment group and deployment are selected as previously described;

Selecting Start Date: the user provides a start date by choosing a month, day and year by or by clicking the 'Calendar' button to pop up a calendar 803 and select a date.

Selecting Start Time.

Naming the Deployment Instance 802;

Specifying parameters: specification of unique name:value pairs

Creating a Description: the user can describe the scheduled Deployment in greater detail; and Specifying Deployment Frequency: if once is selected, then the deployment runs run at the date and time specified. Instead select a frequency may be selected, such as daily. Depending upon the frequency selected, it may be necessary to provide additional scheduling details.

The schedule details are saved by clicking the 'Save' button. A 'Deployment Schedules' window (not shown) is accessible via 'View Schedules' in the navigation tree 610. Having functional capabilities analogous to the "View Deployments" window, this feature allows the user to edit details, delete jobs, hold or activate a pending job, and refresh the view based on the selected deployment and group. The command line interface may also be used to schedule deployments, deactivate scheduled jobs, delete jobs and retrieve schedule details.

Centralized Administration

The invention includes an SNMP (simple network management protocol) agent to enable monitoring of the system via standard network management tools.

Administrators obtain status and alerts that are readily correlated to deployment reports and log. Such alerts include, for example failure conditions, such as abnormal termination of a deployment process, failure of a distribution job, and 'hung' jobs that are idle for extended periods of time. By providing flexible and comprehensive feedback within large multi-server networks, the administrator is allowed to track the overall health of the network.

Additional features facilitate large-scale installations of the invention. For example:

deployment groups simplify deployment management and authorization;

changes can be made to multiple Base Servers or Receivers in a single batch;

routed deployments streamline distribution over hundreds of nodes;

target references for parallel deployments can be consolidated so that a single change is quickly and accurately applied to many deployments;

fine-grained user rights allow segmenting of enterprise initiatives;

manage servers remotely;

generate detailed reports;

integrate external tasks with deployment jobs;

connect into diverse IT environments; and incorporate provisioning into a service oriented architecture.

User Authentication and Deployment Authorization

Figure 8:
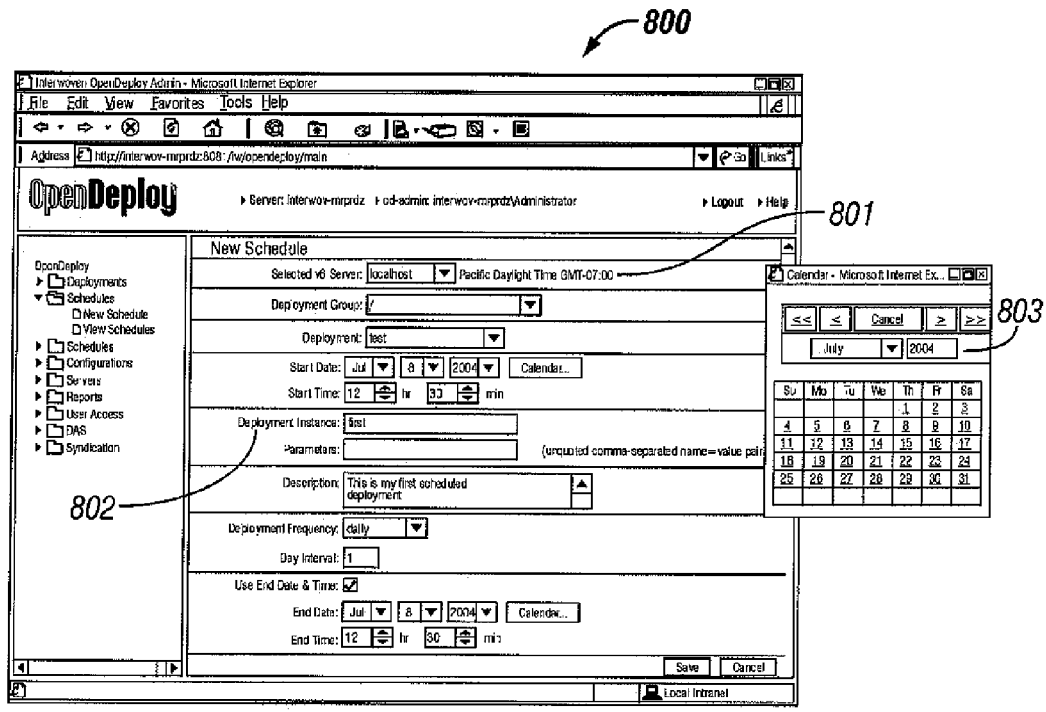
FIG. 8 provides a screen shot of a user interface for scheduling deployments from the administrative UI of FIG. 6 according to the invention.

Using the Administrative UI, an administrator can assign access privileges to users. By expanding 'User Access' (FIG. 8) in the navigation tree, the administrator able to define the following controls:

User Authentication: Selecting the 'Servers' sub-entry beneath 'User Access' in the navigation tree allows the administrator to authorize a user to access Base Servers or Receivers. For example, the administrator first selects a server name from the pull-down menu 904, and enters or selects the Username of a user to whom access rights are to be assigned 905. Some embodiments include a 'Lookup User' feature (not shown) that allows the administrator to view the available roles for a particular user. The administrator can then select a role for the user and add it. As a result, the user is permitted access to the selected server with the assigned role;

Deployments: The administrator selects 'Deployments' from the navigation tree to authorize a user to initiate specific deployments 903 or access certain deployment groups 901. With the server and the deployment user from above selected, the administrator chooses a deployment group; for example, the root level group (/). This displays the contents of the deployment group. Next, the administrator chooses a deployment from the deployment list; for example, test. Clicking the 'Add' button 902 authorizes the user to run the deployment. Hierarchical organization of configurations into deployment groups simplifies management and authorization. Thus, rather than applying access rights to individual deployments, the administrator can authorize an entire deployment group. The user is then able to run any deployments associated with the group.

Figures 9, 10:
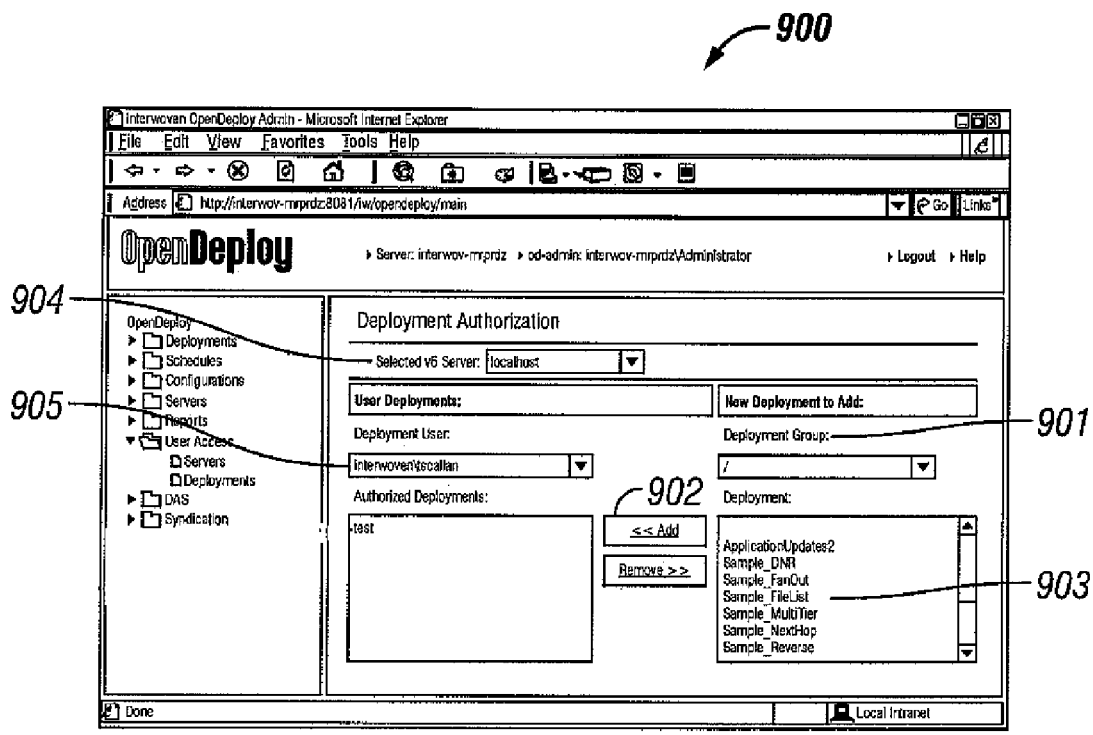
FIG. 9 provides a screen shot of a user interface for managing user rights and privileges from the administrative UI of FIG. 6 according to the invention.
FIG. 10 provides a screen shot of a user interface for viewing server status from the administrative UI of FIG. 6 according to the invention.

Additionally, as shown in the user interface 900 of FIG. 9, the administrator can also assign rights by deployment, rather than by server.

Server Management

The Administrative UI allows the administrator to view and edit server details in much the same way that other parameters have been configured. To see the server list, one expands 'Servers' in the navigation tree and selects 'View Servers.' Each server has a name, address and registry port. For example, a default entry is:

TABLE 1

| Name | Address | Port |
|---|---|---|
| localhost | 127.0.0.1 | 9173 |

An 'Edit' button next to a server allows the administrator to update the server's details. A 'New Server' button allows the administrator to add a new server by specifying server details: 'Name:' a unique name for identifying the server; for example, 'myserver;' 'Address:' a resolvable host name or IP address; and 'Port.' Clicking a 'Save' button saves the new server to the server list. Afterward, the name 'myserver' appears in the list of servers, which is available in other parts of the Administrative UI; for example, when authorizing deployments.

A 'Manage Server' option, under 'Servers' allows the administrator to view and upload Baser Server and Receiver configuration files. Viewing a configuration file involves the following:

Select a Server, for example, 'localhost', a 'View Log' button displays a global log for the server;

In-Use Config Files: Lists the XML-based configuration files in use by the selected server. (Clicking 'Refresh Server' causes the server to re-read its configuration files.)

All Config Files: Allows viewing and uploading of configuration files. To view a file, one scrolls down and chooses a file from the View File pull-down menu. In an exemplary embodiment of the invention, the configuration files could include the following:

odbase.xml or odrcvr.xml: Global settings for the server;
odnodes.xml: Logical nodes used in deployment configurations;
eventReportingConfig.xml: Event publishing settings for deployment reporting;
jmsconfig.xml: Settings for underlying reporting subsystem
odsnmp.xml: SNMP agent configuration details; and
database.xml: Connection details for database deployments.

The above listing of files is only illustrative and is not intended to limit the invention. An 'Upload' button allows uploading of a configuration file to a selected server.

When an installation includes many servers, they can be managed in groups. Selecting a 'View Server Groups' option under the 'Servers' heading in the navigation tree displays a list of server groups and a 'New Server Group' button. Clicking the 'New Server Group' button launches a 'New Server Group' window.

Creating a new server group includes steps of:
supplying a Server Group Name; for example, myservergroup;
adding servers to the group. for example, localhost is added by first selecting the server name and then clicking the 'Add' button. In this way, the administrator adds as many servers to the group as desired;
saving the group. In the current embodiment, one saves by clicking the 'Save' button.

Selecting a 'Manage Server Group' option under the 'Servers' heading in the navigation tree allows the administrator to upload configuration files in batch and refresh servers. For example, selecting a 'Refresh Server Group' button causes each server in the group selected to reread its configuration files. As shown in table 1000 in FIG. 10, the status of the operation is displayed. Clicking an 'Uploading/Refreshing Status' button to update the UI with the latest progress. An 'Upload' button works similarly by sending a configuration file to the group. The appropriate local node details can be automatically substituted into the uploaded file.

Reporting

Figure 11:
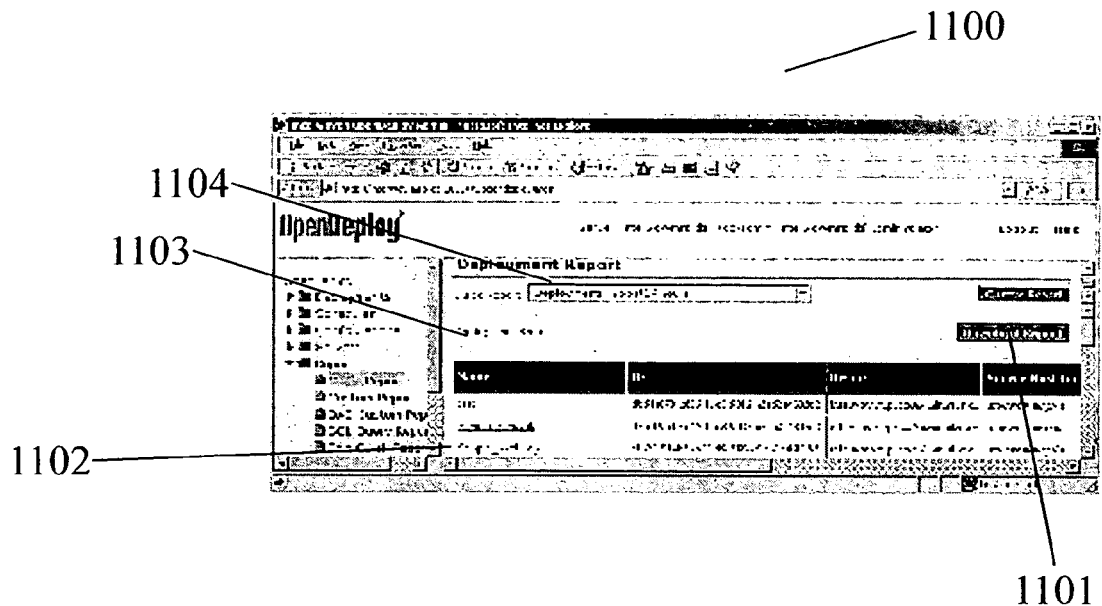
FIG. 11 provides a screen shot of a user interface for generating and managing reports from the administrative UI of FIG. 6 according to the invention.

Base Servers and Receivers can be configured to publish records of events that are stored in a central database so that the results of deployments are easily determined. In one embodiment of the invention, the reporting figure is configurable to any JDBC (JAVA Database Connectivity)-compliant database. As deployments are run, data related to the deployment are saved to a reports database. As shown in FIG. 11, the Administrative UI provides several ways of generating and managing reports. Each method can be accessed by first expanding 'Reports' in the navigation tree.

Figure 12:
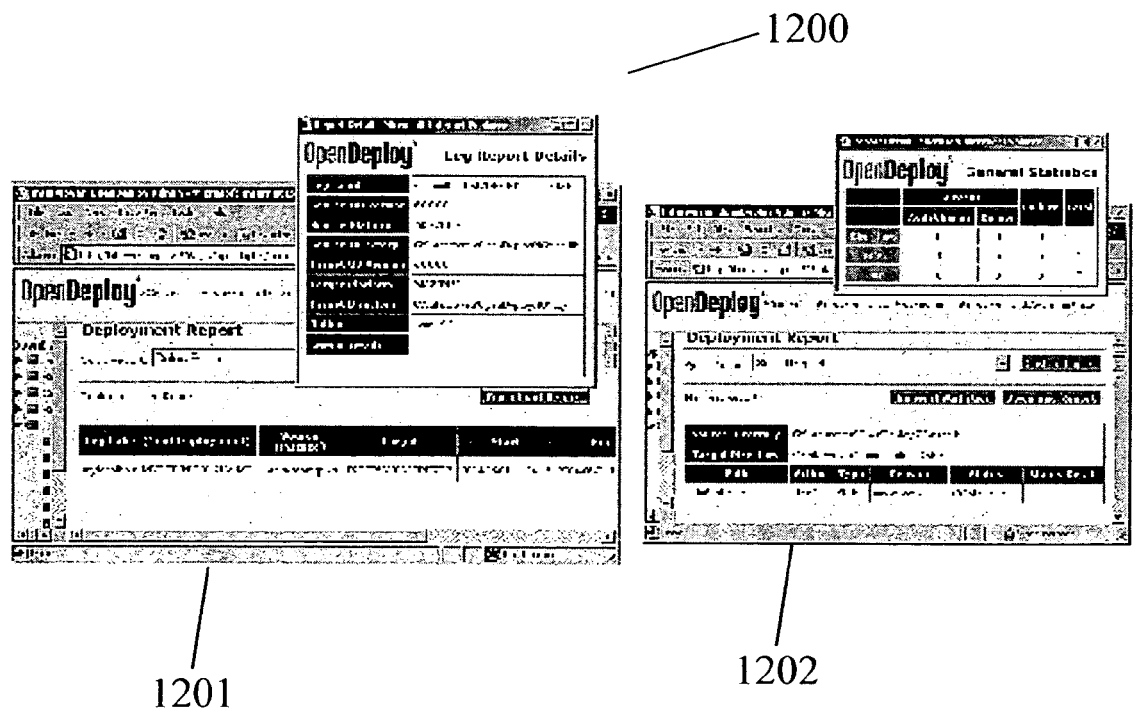
FIG. 12 provides a screen shot of a deployment leg report and a manifest report accessible via the user interface of FIG. 11 according to the invention.
Figure 13:
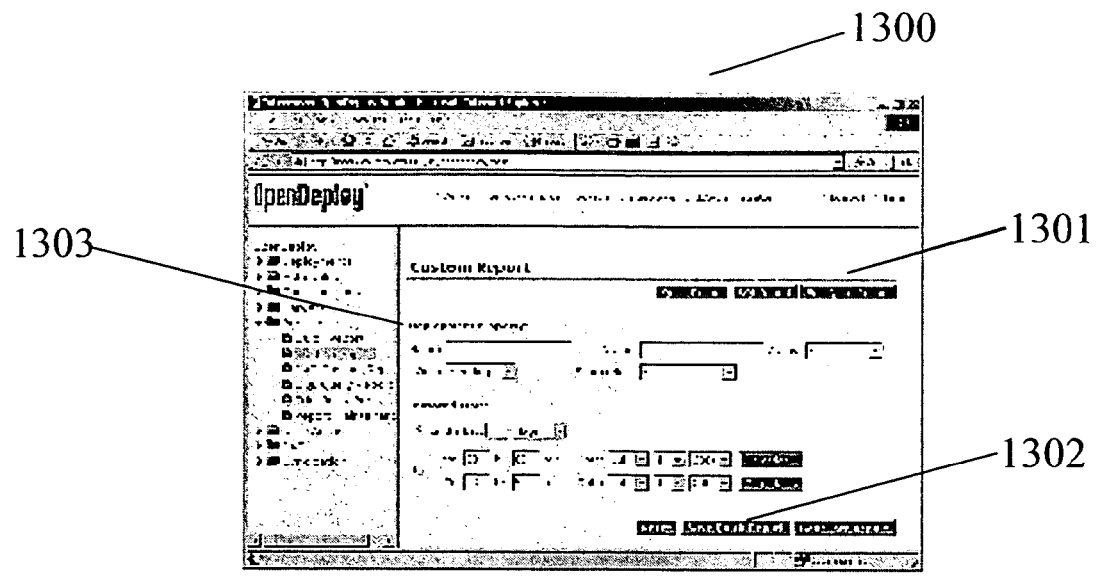
FIG. 13 provides a shot of a screen for configuring a custom report from the user interface of FIG. 11 according to the invention.

Quick Report: Offers a quick way to generate reports through pre-defined queries. One runs a report by selecting 'Quick Reports' 1104 in the navigation tree. A report is then chosen from the pull-down menu; for example, 'Deployments in past 24 hours.' Results 1103 are shown in the UI 1100. Additionally, the report can be saved as character delimited file by clicking a 'Download Report' button 1101. Hyperlinks 1102 in the report allow the viewer to drill down for more details, including which files were transferred, source and target information, and statistics, as shown in the detail windows 1200 of FIG. 12. For example in the 'Name' column of the report, one selects the first test deployment you Ran to view deployment leg details 1201. Clicking a 'View Details' button displays specifics about each leg. Selecting a leg e.g. 'labelmylocalhost.MYDEFINITIONNAME' displays a manifest 1202. A 'General Statistics' button on the manifest report displays summary data;

Custom Report: FIG. 13 shows a user interface 1300 for specifying custom queries. One selects 'Custom Report' in the navigation tree and fills in the search values 1303. The query can be saved as a Quick Report by clicking 'Save Quick Report' 1302 and naming the query when prompted. Click 'Generate Report' runs the query. As with Quick Reports, results can be viewed in the UI or saved to a character-delimited file;

SQL Query Report: Supports the creation of free-form queries. On starts by seeding the SQL (Structured Query Language) query with a custom report query 1301. This launches a 'SQL Query Report' window and pre-populates the SELECT statement, which can then be tailored to the specific need. A SQL Query can be saved as a 'Quick Report' or run from the UI. Results may be viewed directly and saved to a character-delimited file;

DAS (Database Auto synchronization) Custom Report: Described in greater detail below, enables the creation of custom queries for deployments that synchronize a content management application with a relational database;

Edit Quick Report: Allows editing and deletion of Quick Report queries. Selecting 'Edit Quick Report' in the navigation tree presents a list of queries. Choosing an item from the list and clicking 'Edit Query' will take the viewer to any of the 'Custom Report' 'SQL Query Report' or 'DAS Custom Report' windows, depending on which was used to create the original query. 'Delete Query' removes a report from the list; and Report Maintenance. Lets administrators delete old records from the reporting database. Because reporting events can be stored in any JDBC-compliant database and the schema is documented, integrating third party tools or custom report generators is readily accomplished.

Deploy-and-Run

A deploy-and-run (DNR) feature provides event triggers for integrating external programs or scripts into the distribution process. External tasks can be launched on source and/or target systems. Triggers may occur before or after the various points upon success or failure. Such points may include:
  Deployment job;
  Connection established between sender and each target;
  Data transferred to each target; and
  Connection closed between sender and each target.

For example, the distribution of files from a content or code management system might utilize the following triggers during the distribution process:
  Before deployment job: Promote a collection of files;
  After connection: Shut down a service running on each target system;
  After data transfer: Restart the service on each target; and
  After data transfer on failure: Send an e-mail notification Deployment Cofigurations The invention takes a flexible, configuration-based approach to deployments configuration due to the tedious, error-prone nature of custom scripting.

Deployment configurations specify deployment rules using industry-standard XML. A rich vocabulary supports various distribution strategies. The user can create new configurations or they can modify examples provided. Configuration can be written and/or edited using third party editors, or the editing capability provided by the Admin UI.

Figure 14:
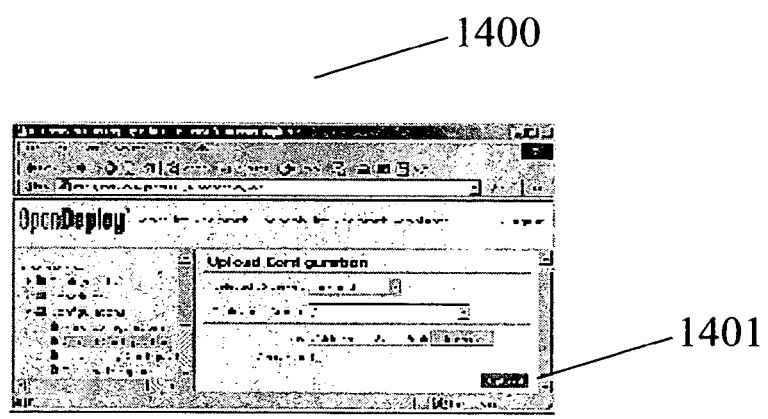
FIG. 14 provides a screen shot of a user interface for managing deployment configurations from the administrative UI of FIG. 5 according to the invention.

Uploading a deployment configuration to a Base Server 1401, as shown in the Interface 1400 of FIG. 14, includes the following steps:
  Expanding the 'Configuration' menu in the navigation tree and selecting 'Upload Configuration;'
  Selecting the server, for example 'localhost;'
  Specifying the deployment Group, for example the root level group (/); and
  Specifying the file. As shown, the 'Browse' button may be used to Locate a deployment configuration file, for example, 'OpenDeployNG/examples/conf-od/fanout.xml;'
  Checking the box to overwrite a file having the same name on the target server; and
  Clicking the 'Upload' button to copy the file to the selected server.

Figure 15:
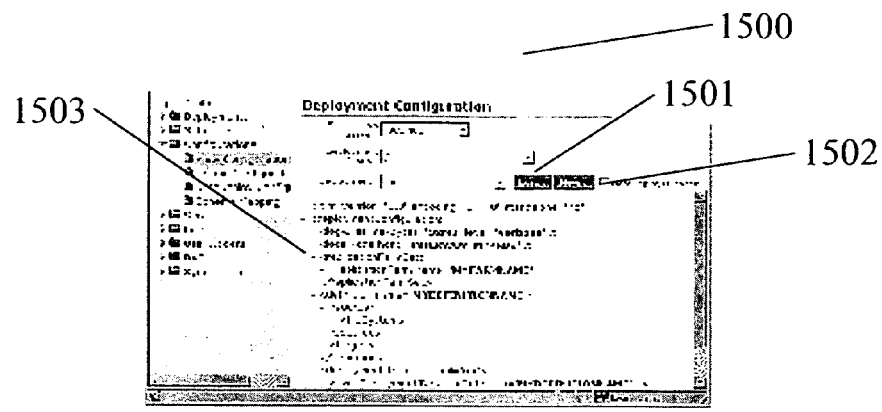
FIG. 15 provides a screen shot of a user interface for viewing deployment configurations from the administrative UI of FIG. 5 according to the invention.

Viewing the contents of a deployment configuration (FIG. 15) includes steps of:
  Selecting 'View Configurations' in the navigation tree;
  Selecting a server as above;
  Selecting a deployment group as above; and
  Choosing a deployment from the list as above.

The contents of the selected deployment configuration are displayed. After selecting an XML element 1503 in the configuration, the element can be expanded or collapsed by clicking the adjacent '+' and '−' signs.

One can also edit a deployment configuration from the UI 1500:
  With 'View Configurations' selected in the navigation tree:
  After selecting server, deployment group and configuration, clicking the 'Edit' button 1501. A 'new' button 1502 allows the user to create an entirely new configuration.

Figure 16:
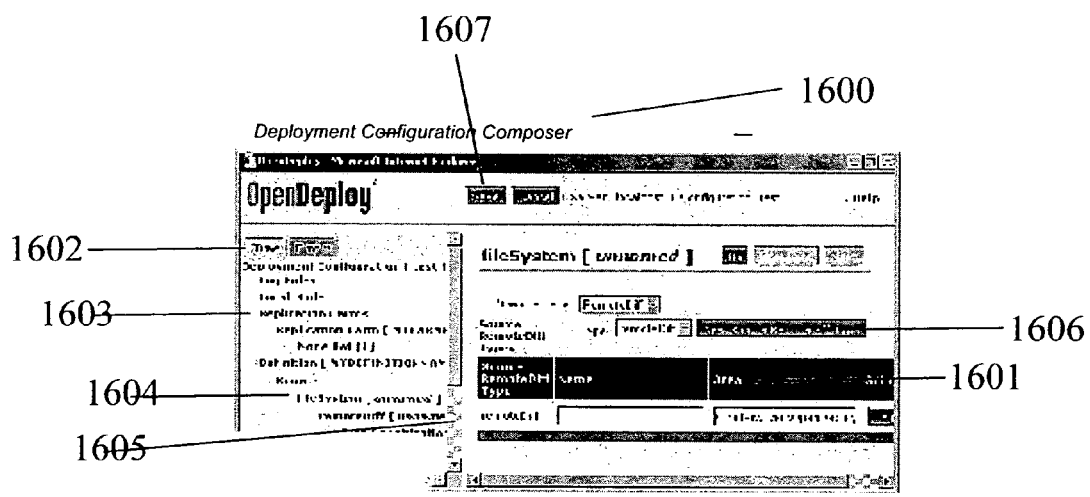
FIG. 16 provides a screen shot of a deployment configuration composer from the administrative UI of FIG. 5 according to the invention

This brings up the Deployment Configuration Composer 1600 (FIG. 16), which allows the user to edit the configuration according to pre-defined XML rules. As shown in FIG. 16, the Composer has two views, either 'Errors' or 'Tree' view. Tabs 1602 are provided for selecting the view. The composer has a navigation tree 1603 for accessing deployment configuration elements. The right side allows the user to update, add and remove elements and attributes. For example, the node 'fileSystem' 1604 (about mid-way down in the tree) contains a 'remoteDiff' 1605 element having an 'Area' attribute 1601.

Adding a new element involves steps of:
  Selecting anode in the tree, for example 'file system' 1604 and click the button 'New Source RemoteDiff Type' 1606 to add a second remoteDiff source. The Composer interface distinguishes incomplete elements, for example by highlighting them in red. Clicking the 'Errors' tab furnishes an explanation;
  Selecting the newly added 'Source' in the navigation tree and entering a full pathname of a directory for the 'Area' value; for example, "C:\mydir\" in a WINDOWS environment or "/mydir/" in a UNIX environment;
  Selecting the 'Path' element in the navigation tree for the newly added 'Source' and entering a name value; here the name value is '.' The path is appended to the 'Area' value during deployments; for example "C:\mydir\." or "/mydir/."

In order to prevent the original configuration from being overwritten, the newly edited configuration must be renamed before changes are saved. In the present example, the deployment configuration is named 'test.' By selecting 'Deployment Configuration' in the navigation tree and entering a new 'name' value, for example 'mytest,' a new file, distinct from the 'test' file is created. After renaming, clicking the 'save' button 1607 at the top of the work area saves the file. After the file is saved, the XML is displayed in the composer window. After creating a new configuration file, the user can run the deployment as previously described.

The above description of the steps involved in using the Configuration Composer is intended to illustrate the principles of the invention, and is not meant to limit the invention. By relying on the above description, one having an ordinary level of skill in the appropriate art would be enabled to make and use the invention.

In addition to file delivery, deployment configurations support the delivery of structured XML content into relational databases. 'DataDeploy Configuration' and 'Schema Mapping' may be selected in the navigation tree for setting up database deployments, which are described in greater detail below.

Parallel Deployment to Multiple Targets

Figure 17:
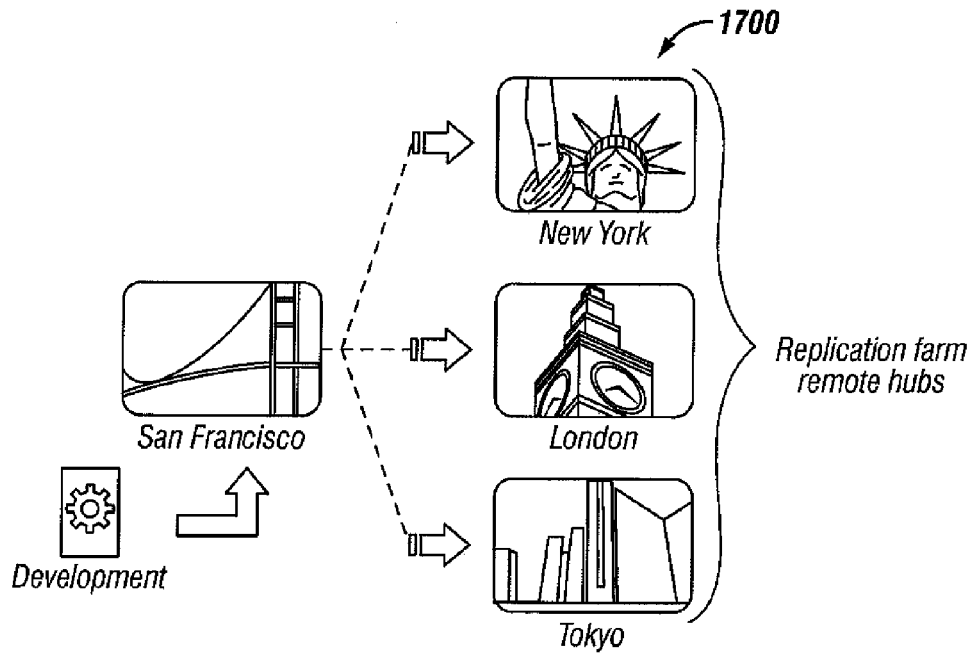
FIG. 17 illustrates a parallel deployment from the system of FIG. 1 according to the invention.

FIG. 17 shows a network topology 1700 for a parallel deployment. The invention may distribute to multiple targets in parallel, which is more efficient than deploying to each target separately. For example, updates can be made transactional to ensure proper synchronization across servers. This is typically necessary for load-balanced or clustered web applications. The invention also implements the concept of logical "nodes" and "replication farms," which allows the user to dissociate the physical identification of networked systems from deployment configurations and to conveniently organize sets of nodes. So, for example, you can simply deploy to the farm 'Remote Hubs', which consists of the logical nodes 'New York,' 'London,' and 'Tokyo,' as shown in FIG. 17. Replication farms are defined or referenced within each deployment configuration. 'Target references' let the user make changes to replication farms in a consolidated file, which is faster and more accurate than having to update many individual deployment configurations.

Multi-Tiered Deployment Chaining and Routed Deployment

The invention supports multi-tiered server topologies in which deployments are chained from one tier to the next. Target systems may be geographically dispersed, with no limit to the number of tiers in the deployment chain.

Typical scenarios include:
- Distributing to hub nodes that in turn deploy to regional server farms;
- Hot-standby or disaster recovery sites;
- Conserving system resources when distributing to a large number of targets; and
- Optimizing network bandwidth and server utilization across wide area networks.

Figure 18:
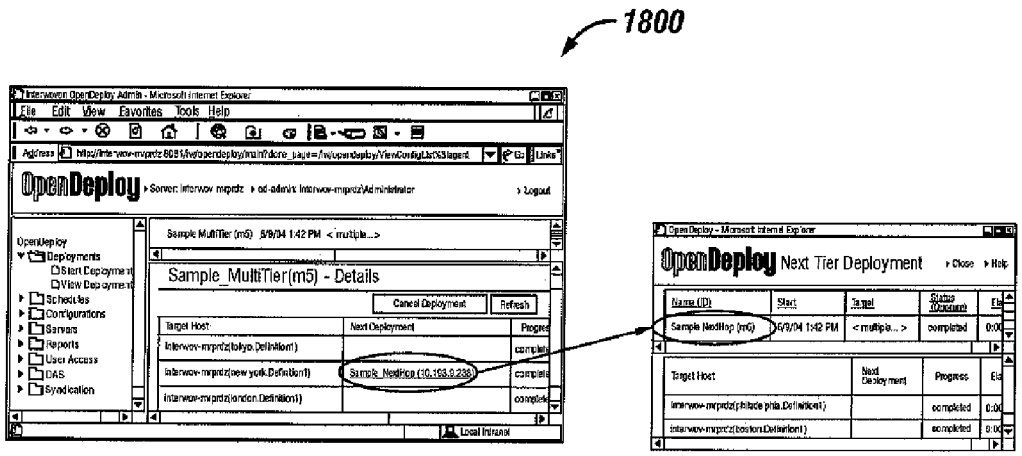
FIG. 18 illustrates a multi-tiered deployment from the system of FIG. 1 according to the invention.

Chaining means specifying within the deployment configuration which deployment to invoke next on a target system. FIG. 18 shows a view 1800 of the Admin that illustrates chaining. For example, to automatically replicate content to European sites after deploying from 'San Francisco' to 'London,' the user simply specifies in the San Francisco deployment configuration which deployment to initiate next on the London system. As shown in FIG. 18, the Administrative UI provides hyperlinks that allow point-and-click navigation to downstream deployment status. It is also possible to request the termination of an active deployment via the Administrative UI or through the command line interface.

Figure 19:
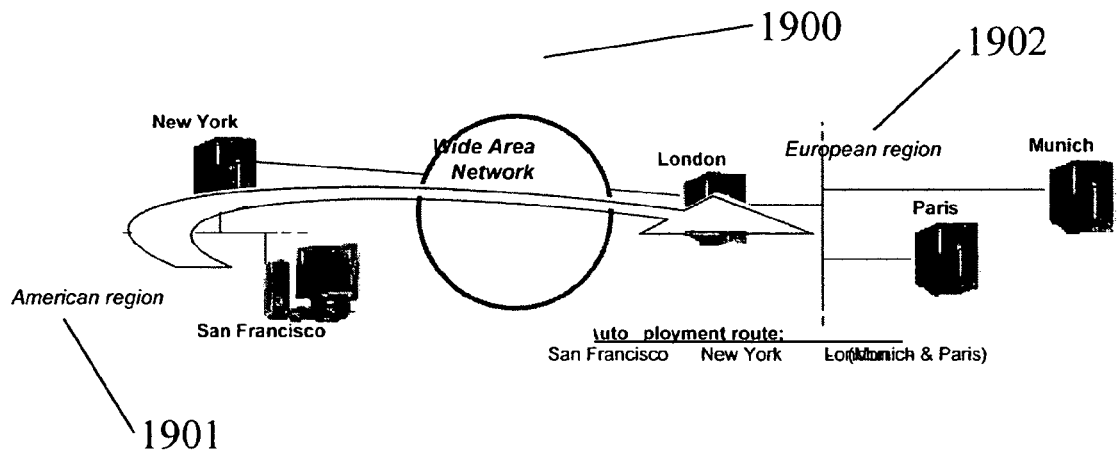
FIG. 19 illustrates a routed deployment from the system of FIG. 1 according to the invention.

Routed deployments 1900 build on multi-tiered chaining to provide a highly scalable distribution approach, as shown in FIG. 19. An exemplary routed deployment, from an American region 1901 to a European region 1902 involves separate legs from San Francisco to New York, New York to London, and then London to both Paris and Munich. However, rather than explicitly configuring each hop of the deployment, a route is automatically computed from a pre-defined set of route segments, simply by specifying the source and destination. In this way, the invention provides a means for configuring deployments from source to target nodes without having to worry about the route taken to reach each destination. The reporting database records a unique ID for each routed deployment, which yields a comprehensive audit trail by associating an initiating job with all downstream deployments.

Reverse Deployment

Distribution typically entails pushing updates to one or more servers. Conversely, a reverse deployment, briefly mentioned above, pulls files from a server. Examples where reverse deployments are used include:
- Retrieval of production log files for archiving;
- Copying a production server as the basis for a new web site; and
- Transferring assets from outside a firewall when security policies dictate that connections must be initiated from inside the firewall.

Manipulation Features

The invention also provides several means by which files can be manipulated during the distribution process. These include:
- Filters: A deployment configuration may specify rules for including and excluding files and directories. The invention supports location-based filters as well as pattern-based filters using regular expressions;
- Transfer rules: A set of rules covers how files should be handled during data transfer. These include deleting target files that are no longer present at the deployment source, preserving access controls, whether to follow symbolic links, timeout values, and retry counts. It is also possible to specify data compression levels when transmitting over bandwidth-constrained networks;
- Permission and ownership rules: The invention provides the capability of specifying rules for manipulating permissions and ownerships of deployed files and directories;
- Internationalization: The invention honors data encoding specific to the system locale. For example, Japanese files that contain multi-byte characters can be deployed. In addition, XML configuration files may use UTF-8 or local encoding.

Content Integrity and Security

Businesses cannot maintain customer-facing web presences with stale data and incorrect application code. Nor can an enterprise operate effectively with information that is not always current and available. The invention provides a number of means to help manage the flow of code, content and configurations while maintaining data integrity, synchronization and security throughout the entire distribution process.

Transactional Distribution

Figure 20:
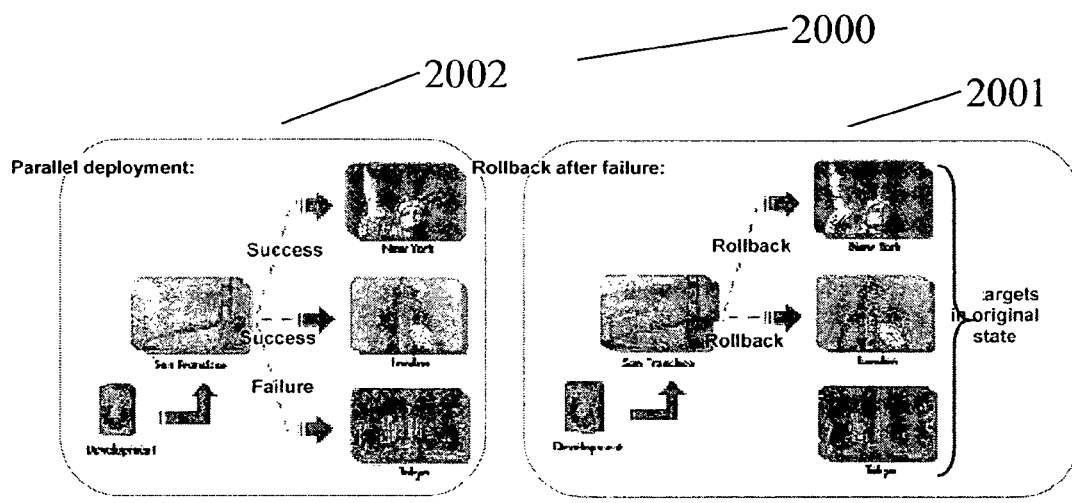
FIG. 20 illustrates rollback of a parallel deployment after failure according to the invention.

The invention ensures data integrity and application reliability by tracking transfer details and rolling back in the case of deployment failure. When an interruption occurs, the invention rolls back the deployment transaction and restores each target to its previous, error-free state. Any deployment can be transactional:
- Parallel deployment: As previously described, the invention provides the capability of making parallel deployments, so that the user can update multiple targets simultaneously, which is more efficient than deploying to each target separately. As shown in FIG. 20 A transactional parallel deployment 2000 assures that all destinations are kept completely synchronized. This is typically necessary for load-balanced or clustered web applications. A parallel deployment 2002 is made transactional 2001 by simply setting an attribute in the deployment configuration. Doing so ensures that each parallel deployment leg runs in lockstep: setup, transfer, and commit. If one leg fails, then all targets are rolled back to their original state;
- Quorum: Parallel deployments sometimes require only a subset of targets—known as a quorum—to receive updates for a transaction to be considered successful. The invention allows the user to specify the number of targets to which updates must be successfully delivered before the deployment transaction is committed. The quorum value can range from one to the total number of fan-out targets. If the quorum is met, successful targets are committed and failed ones are rolled back. Thus, each target is always left in a known state—updated or original.
- Multi-tiered and routed deployments: As described above the invention provides approaches for delivering updates to many servers efficiently by deploying to one tier of targets, which in turn deploys to a second tier, and so on. Transactional deployments ensure the integrity of updates across all servers, regardless of location within the network topology. If delivery to any server fails, all servers roll back to their original state. Additionally, the quorum feature may be employed to enforce unique success criteria at each tier.

Logging

Figure 21:
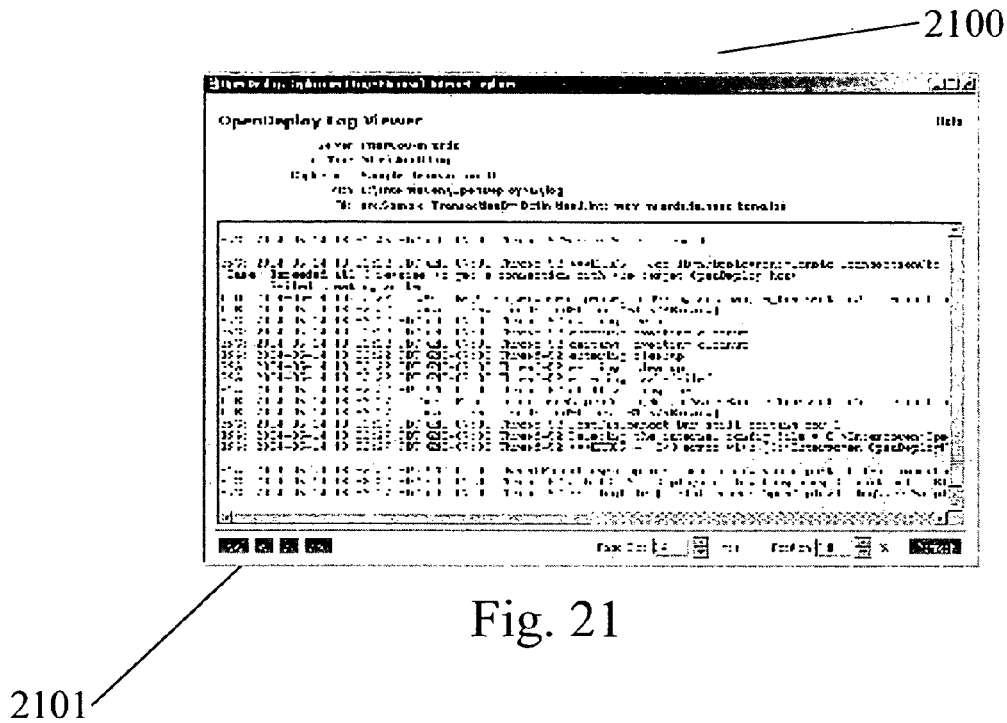
FIG. 21 provides a screenshot of a log view from the administrative UI of FIG. 4 according to the invention.

A logging facility generates comprehensive logs for archiving and troubleshooting. Log files on sender and receiver systems provide audit trails that can be used to satisfy compliance requirements by proving exactly when and where updates were distributed. A user-configurable threshold limits the maximum size any log file is permitted to attain before it is archived and a new log is started. Log files can be accessed from the file system or viewed directly in the Administrative UI. Whenever a deployment is run, log files are created for the deployment job. The user can view log files for a particular deployment by selecting 'View Deployment' in the navigation tree. The 'View' pull-down menu provides options for viewing both sender and receiver logs. Clicking a 'View Log' button next to an item in the Deployments list (upper half of the Administrative UI) opens a 'macro' log. The Log Viewer 2100 (FIG. 21) shows entries pertaining to all jobs run with the particular deployment name. Clicking 'X' at the top right corner of the window closes the Log Viewer. Additionally, a 'View Log' button also appears next to each item in the Details list. Each corresponds to a 'micro' deployment log, which contains details for a pairing of source-target servers. At the bottom of the Log Viewer, buttons 2101 are provided for navigating through a log file and for refreshing the display.

Secure Distribution

Figure 22:
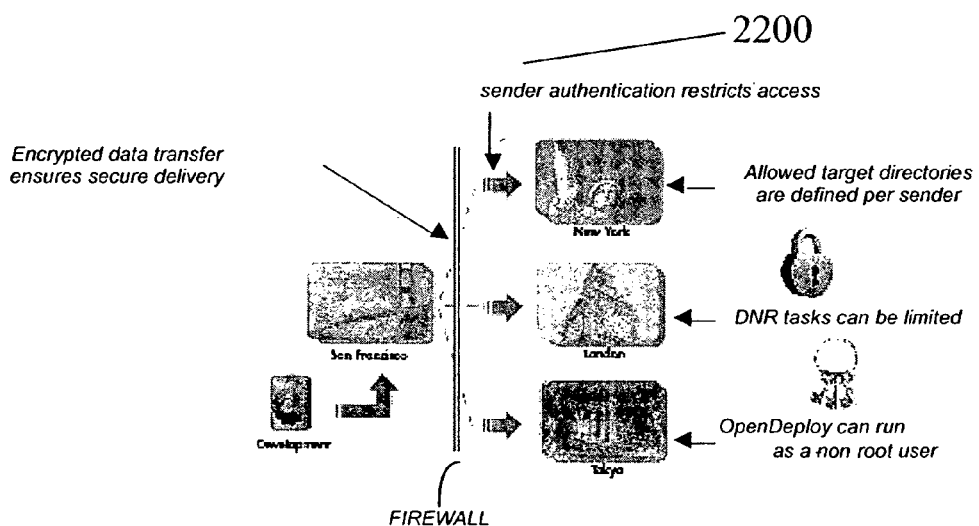
FIG. 22 provides a diagram illustrating security measures of the system of FIG. 1 according to the invention.

The invention incorporates a number of features that enable secure distribution of code, content and configurations inside and outside firewalls as shown in the topology diagram 2200 of FIG. 22. If desired, data can be encrypted during transfer to protect enterprise-sensitive information. Both strong (up to 168-bit SSL (Secure Sockets Layer)) and weak (40-bit symmetric key file) encryption mechanisms are supported.

Port authentication ensures that deployment targets communicate with only known senders, either directly or through firewalls. SSL authentication may be enabled for added security. Furthermore, the invention allows the user to restrict the directories to which trusted senders may deploy updates and to limit or prohibit the invocation of Deploy-and-Run tasks, described above, on receiving systems.

The invention offers the flexibility to configure the deployment listener port and administration ports. For example, Base Servers and Receivers can run with the level of authority deemed appropriate by the administrator. Thus, the invention can run as a root or non-root user in UNIX environments, and as an administrator or non-administrator in WINDOWS environments. When running multiple instances of the invention on the same host, each instance is separately configurable. For example, a hosting center may set up a unique Receiver instance for each client that will deploy updates. Each Receiver may have its own encryption setup and may be authorized to update specific file system directories. Additional security measures include the ability to lock down command line invocations to specific hosts, as well as confining user authentication for the Administrative UI and web services to a specific access service.

Database Auto-Synchronization (DAS)

the invention provides the capability of event-driven synchronized deployments of content from various repositories. The present feature finds particular application in enterprises using content management software, for example TEAMSITE, supplied by INTERWOVEN, INC., Sunnyvale Calif., to manage web content. DAS automates deployment of forms-based structured content (known as data content records, or DCRs) into a database for rendering within the development environment. DAS also enables the indexing of extended metadata into a database, which can then be used as the basis for metadata-based publication and expiration of content, described in greater detail below.

Preferably, the Base Server is configured for database deployments to activate DAS. A content management system is preferably also present on the Base Server host. The Administrative UI can then be used to configure DAS and set up the content management system event server by expanding 'DAS' in the navigation tree. In addition, DAS deployment reports are accessible by expanding 'Reports' in the navigation tree and selecting 'DAS Custom Report Deployment of Database Content As described above, the invention provides unified distribution architecture 2400 that seamlessly combines secure, reliable file distribution with delivery of structured content 2401 to databases 2404 that drive business applications, personalization servers, enterprise portals and search engines. In a further embodiment of the invention, a data deployment module 2402 enables a Base Server to securely deliver relational database content via a standard Receiver 2403. Integrated transactional delivery of file and database updates advantageously facilitates synchronized deployment to load-balanced or clustered applications. File and database distribution is managed within a single user interface and reporting subsystem, minimizing the time needed to set up and record deployment activity.

Figure 23:
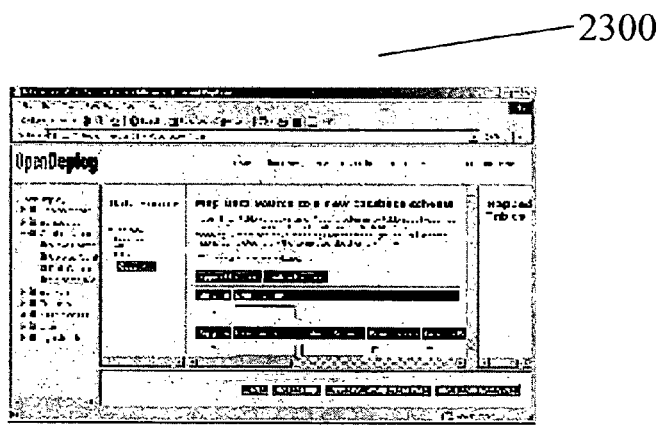
FIG. 23 provides a screen shot of a user interface for a module for synchronized deployment of database content from the system of FIG. 1 according to the invention.

The data deployment module is an optional feature that is first activated, for example by running a license enablement utility. Following this, Base Server and Receiver are configured for database deployments. The Administrative UI can then be used to configure database deployments by expanding 'Configurations' in the navigation tree as shown in the interface 2300 of FIG. 23:

- 'DataDeploy Configuration' allows the user to specify rules for the deployment, for example: type and location of source files, which schema mapping to use, and the target database specification;
- 'Schema Mapping' allows the user to map the DTD (document type definition) for the source data to the target database schema;
- 'Wrapper configurations' allows storage of configurations with their associated source data. A wrapper configuration is created by selecting 'View Configurations' in the navigation tree, choosing a server and deployment group, clicking a 'DataDeploy Wrapper' check box, and clicking the 'New' button to bring up a Configuration Composer.

Figure 24:
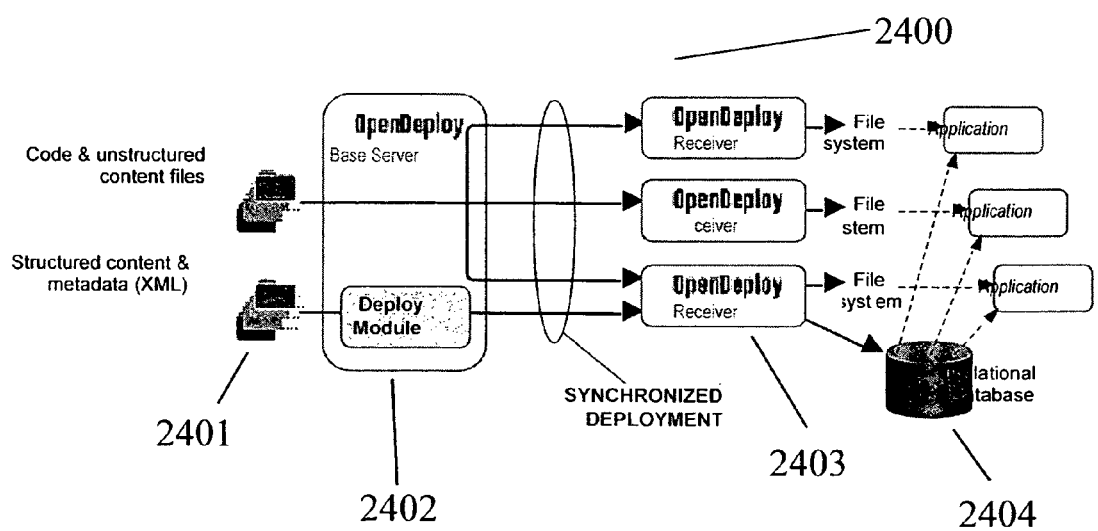
FIG. 24 provides a diagram of an architecture for synchronized deployment of database content from the system of FIG. 1 according to the invention.

When configured for combined database and file deployment, the invention synchronizes the delivery of XML-based structured content 2401 to the target database with delivery of code and unstructured content files to multiple servers as shown in FIG. 24.

Intelligent Delivery Module

In a further embodiment of the invention, an intelligent delivery module enables a Base Server to use content attributes for smart distribution and syndication:

Metadata based deployment: Deployment criteria are specified using a metadata query, for example

TABLE 2

| Action | Example |
|---|---|
| Deploy based on metadata | Deploy files with archive = true and importance = high |

TABLE 2-continued

| Action | Example |
| --- | --- |
| Publish based on date | Deploy reports with publication date after Jun. 6, 2004 |
| Delete based on expiration | Expire web pages with expiration date after Jul. 7, 2004 |
| Deliver to specific audiences | Deploy reports tagged with group = FundSubscribers |

Metadata-based deployment relies on a payload adapter, described above, that supports use of a JDBC-compliant database as the metadata repository. When combined with DAS or the data deployment moduls, described above, content attributes can provide the basis for metadata-based publication and expiration of content. Users may also write their own payload adapters to integrate with other metadata repositories.

Figure 25:
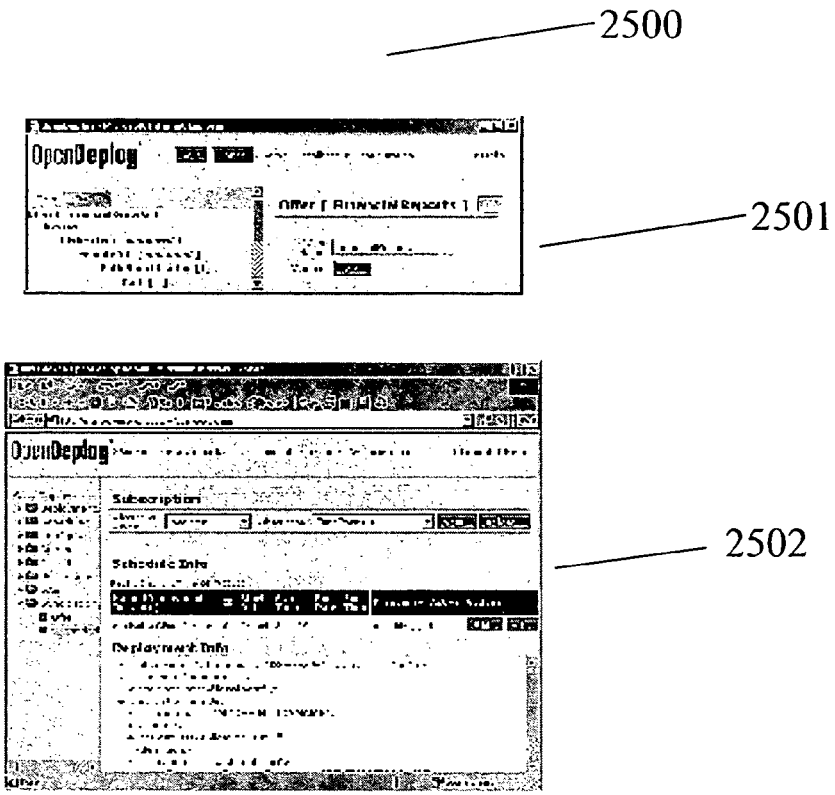
FIG. 25 provides screen shots of the user interface for an intelligent delivery module from the system of FIG. 1.
Figure 26:
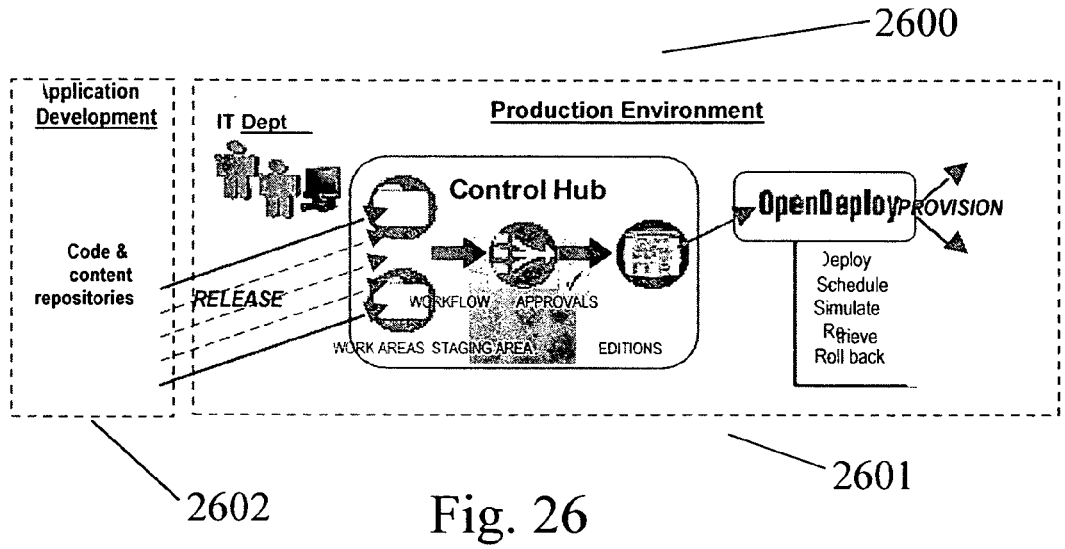
FIG. 26 provides a schematic of a control hub for automating provisioning of web application updates according to the invention.

Syndication: Content reuse through syndicated delivery is supported via an offer/subscription management layer 2500, as shown in FIG. 25. An offer 2501 defines the content source and criteria, including the metadata query for identifying relevant assets. A subscription 2502 completes the deployment rules for an offer, including target nodes, schedule, and delivery mechanism, such as FTP or e-mail. Syndication takes advantage of the built-in scheduler, supra; metadata-based deployment, supra, and delivery adapters supra. The Intelligent Delivery module is optional and is activated in the same way as the data deployment module. Offers and subscriptions can then be configured using the Administrative UI by expanding 'Syndication' in the navigation tree.

Creating an offer is similar to creation of a deployment configuration. An offer is a partial deployment configuration that contains details about the source content location and criteria, including a metadata query for determining which content belongs to the offer. For example, an offer might include all financial reports with a metadata tag 'Type' having a value 'Stock.' A subscription defines a completed set of deployment rules for an offer, including the target recipients, schedule and delivery mechanism. For example, one subscription might FTP assets defined by a particular offer to a set of partners on a weekly basis, while another subscription e-mails the same assets once per month to a group of customers. In addition to using the Administrative UI or command line tool, the web services interface can also be used to expose offers and subscriptions through a third-party application, such as a self-service portal for business partners.

Web Change Management Hub

The invention streamlines IT operations by providing for secure, automated provisioning of web application updates. A web change management hub adds further control dimensions to the change management process. These include, for example:

the ability to aggregate and coordinate change sets from multiple code and content repositories. This allows IT operations to control how changes are administered without forcing application developers to alter their tools or release processes;

Immediate rollback of changes using built-in version control. The web change management hub maintains snapshots of code, content and configuration changes so that deployed web applications can be reverted to any previously known good state; and Streamlined change process and approvals with workflow automation.

The management hub 2600 is installed separately on a host with a Base Server. Branches and work areas 2601 provide the organizational structure for managing incoming code, content and configurations. Application files are aggregated into a work area 2601 either by pushing from the respective source repositories 2602 or pulling from within the management hub. The content deployment system can be used to facilitate the transfer of files into the management hub. Alternatively, the files can be copied into a work area through a file system interface to the management hub, which makes the hub store appear as a drive on WINDOWS systems or a file system mount on UNIX. Automated workflows ensure approvals 2603 and notifications occur at the appropriate points in the change management process. When code, content and configuration files are staged and ready to be provisioned, the new application version is saved as an 'edition' 2604 and the content deployment system 2605 deploys the incremental changes to the target servers 2606. Editions provide an efficient mechanism for recording the state of target servers at any point in time. As a result, the content deployment system can instantly roll back an application to a previous state by simply deploying the files that differ between the previous and current editions. Furthermore, editions help satisfy audit requirements by preserving accurate snapshots of web applications as they existed at specific points in time.

Web change management with the management hub and the content deployment system enables IT operations to realize substantial efficiency gains. As a result, change request backlogs that typically plague the web application infrastructure are eliminated and IT departments can be much more responsive to their users. Application developers and business managers benefit from the removal of a critical IT bottleneck, which translates into application changes being deployed to test and production servers quickly and accurately. And perhaps most importantly, enterprises can adhere to IT governance requirements by consolidating and enforcing web change processes while also maintaining historical records and representations of all deployed web applications.

The invention can be utilized throughout a complex web application environment, regardless of where code and content is managed, or where it is destined to go. The content deployment system can directly integrate with a wide range of source code management, or content management systems. In addition, the invention can deliver code or content to any network destination, including at least application servers, web servers, file servers, databases, caches, and CDNs (content delivery network). The result is a distribution solution that can be utilized enterprise-wide.

One skilled in the art will appreciate that, in a preferred embodiment, the various modules and functional units described herein are software modules comprising computer-readable code for carrying out the various processes that constitute the invention's unique functionality. In another embodiment, the various modules could be programmable hardware modules embodying computer-readable instructions for carrying out the various processes that constitute the invention's unique functionality. While the software modules of the preferred embodiment are created using a variety of common languages and protocols, such as JAVA, XML, SOAP, WSDL and SNMP, the invention is not limited to those languages and protocols. The principles of the invention as described herein can be implemented using other languages and protocols. Such are entirely consistent with the spirit and scope of the invention.

Although the invention has been described herein with reference to certain preferred embodiments, one skilled in the art will readily appreciate that other applications may be substituted for those set forth herein without departing from the spirit and scope of the present invention. Accordingly, the invention should only be limited by the Claims included below.

The invention claimed is:

1. A computer readable storage medium encoded with instructions, which when loaded into a digital computational device establishes a content deployment system comprising:
a plurality of nodes connected in a network topology wherein each node communicates with at least one other node via a secure connection, said plurality of nodes including:
at least one sender configured both to receive content and deploy content to other nodes across network domains and platforms; and
at least one receiver configured to receive deployed content;
an administration module for management of content deployments;
a base server, said base server comprising a sender, configured to receive content for deployment to any network touchpoint from at least one content repository;
a module for defining and implementing routed and/or multi-tiered content deployments, said module for defining and implementing routed and/or multi-tiered content deployments comprising a deployment configuration composer;
means for making transactional content deployments and rolling them back in case of failure; and
an intelligent delivery module, wherein said intelligent delivery module enables a base server to use content attributes for smart distribution and syndication, wherein said intelligent delivery module comprises an offer/subscription management layer, said offer/subscription management layer including:
means for creating an offer, wherein an offer defines a content source and a metadata query for identifying relevant assets; and means for creating a subscription, wherein a subscription completes deployment rules for an offer, including any of target nodes, schedule, and delivery mechanism;
wherein a deployment is defined by means of a deployment configuration, said deployment configuration comprising a file that describes a deployment strategy and wherein said deployment configuration defines multi-tiered deployments by chaining deployments from one tier to the next;
wherein said content is transactionally deployed across a plurality of computing devices.

2. The system of claim 1, wherein said at least one sender is configured to receive content deployed from another sender.

3. The system of claim 1, wherein deployments are pushed from one node to another.

4. The system of claim 1, wherein deployments are pulled from one node to another.

5. The system of claim 1, wherein said deployed content comprises any of: data files; database updates; markup code; media files; and application code.

6. The system of claim 1, wherein said connection is secured by means of an authentication process that ensures that communication is with a known machine in a known manner and that data is received from the known machine without interception by a third party.

7. The system of claim 6, wherein a receiver is configured to listen on a specific port for connection from a firewall's specific IP (Internet Protocol) address.

8. The system of claim 7, wherein said receiver is configured to receive content only from a known, trusted source.

9. The system of claim 6, wherein said connection is secured by a certificate-based authentication process.

10. The system of claim 1, wherein content deployed over said secure connection is encrypted.

11. The system of claim 1, wherein said administration module includes a user interface for accessing a plurality of administrative services included in said module, said user interface including any of event-driven and command-line capabilities.

12. The system of claim 11, wherein said plurality of administrative services includes at least one service for managing user rights and authentication.

13. The system of claim 12, wherein said system provides single sign-on capability, so that a user authenticates on said system using authentication credentials for an underlying operating system or user directory.

14. The system of claim 11, wherein said plurality of administrative services includes:
at least one service for managing deployments;
at least one service for creating and viewing schedule entries for automated deployments;
at least one service for any of viewing, editing and uploading deployment configurations;
at least one service for viewing and managing base servers and receivers;
at least one service for creating and running deployment report queries;
at least one service for assigning access rights to base servers and receivers and restricting users' rights to initiate deployments;
at least one service for configuring database auto-synchronization; and
managing syndicated content offers and subscriptions.

15. The system of claim 1, further comprising a module for providing event triggers for integrating external programs into a deployment, wherein external tasks are launched on source and/or target systems.

16. The system of claim 1, further comprising a module that invokes a payload adapter module at the start of a deployment for integrating a sender with an arbitrary source, and wherein said payload adaptor prepares a payload of files to be returned to said sender from the source.

17. The system of claim 1, further comprising a module that invokes a delivery adaptor after files are deployed to a target, wherein said delivery adapter is invoked with a manifest of deployed files, and wherein said adapter processes said deployed files.

18. The system of claim 1, further comprising an interface for programmatic access to system services.

19. The system of claim 1, wherein said system is scalable to include multi-tiered development topologies including servers inside and outside of firewalls.

20. The system of claim 1, wherein deployments distribute only incremental changes between a source and each target.

21. The system of claim 1, wherein a sender is configured to deploy to multiple targets in parallel.

22. The system of claim 21, wherein said deployment configuration defines logical nodes and replication farms that are independent of a physical topology.

23. The system of claim 1, wherein said deployment configuration defines routed deployments by computing a route from a pre-defined set of route segments.

24. The system of claim 1, wherein said deployment configuration specifies rules for including and excluding files and directories.

25. The system of claim 1, wherein said deployment configuration specifies transfer rules to describe how data is to be handled during transfer.

26. The system of claim 1, wherein said deployment configuration specifies permission and ownership rules for deployed files and directories.

27. The system of claim 1, wherein said means for tracking and rolling back transactional deployments comprises a deployment configuration, wherein said deployment configuration specifies that a deployment is transactional, and system services that roll back a deployment transaction and restores each target to its last known good state in the event of failure.

28. The system of claim 27, wherein each leg of a parallel deployment is synchronized with all other legs.

29. The system of claim 27, wherein said deployment configuration specifies a quorum for a parallel deployment, wherein said quorum comprises a defined sub-set of a total number of targets.

30. The system of claim 29, wherein if a deployment to the quorum succeeds, successful targets are committed and failed targets are rolled back.

31. The system of claim 1, further comprising a logging facility, said logging facility providing means for creating log files on sender and receiver systems.

32. The system of claim 31, said logging facility further including a log viewer for viewing said log files.

33. The system of claim 1, further comprising means for any of: locking down command line invocations to specific hosts; and confining user authentication for the administration module to one or more specific access services.

34. The system of claim 1, further comprising a module for synchronizing automated deployments of content from a plurality of repositories.

35. The system of claim 1, further comprising a data deployment module for deploying data updates to relational databases.

36. The system of claim 35, wherein said data deployment module comprises means for any of: specifying type and location of source files; which schema mapping to use; and a target database specification.

37. The system of claim 35, wherein said data deployment module comprises means for any of: mapping document type definition to a target database schema; and creating a wrapper configuration.

38. The system of claim 35, wherein said data deployment module synchronizes delivery of structured content to a target database with delivery of code and unstructured content file to multiple servers.

39. The system of claim 1, wherein said intelligent delivery module comprises means for any of: specifying deployment criteria in the form of a metadata query; and a payload adapter that supports use of a JDBC-compliant database as a metadata repository.

40. The system of claim 1, further comprising a web change management hub for automating secure provisioning of web updates.

41. The system of claim 40, wherein said web change management hub comprises any of: means for aggregating and coordinating change sets from multiple code and content repositories; means for aggregating code, content and configuration files that are ready to be provisioned into editions, wherein an edition is deployed to a target.

42. The system of claim 41, wherein an edition deploys incremental changes to a target server, and wherein said edition provides an efficient mechanism for recording current state of said target server at any time.

43. The system of claim 42, wherein said content deployment system rolls back said target server to a previous state based on said recorded current state by deploying files that differ between previous and current editions.

44. The system of claim 41, wherein an edition preserves accurate snapshots of a web application as it existed at specific points in time, so that audit requirements are satisfied.

45. A computer-implemented method for transactionally deploying content comprising steps of:
providing a plurality of nodes in a network topology wherein each node communicates with at least one other node via a secure connection;
said plurality of nodes including:
at least one sender configured both to receive content and deploy content to other nodes across network domains and platforms; and
at least one receiver configured to receive deployed content;
providing centralized management of content deployments in a system including said plurality of nodes by means of an administration module;
configuring at least one base server, said base server comprising a sender, to receive content for deployment to any type of network touchpoint from at least one content repository;
using a deployment configuration composer, defining and implementing routed and/or multi-tiered content deployments;
wherein a deployment is defined by means of a deployment configuration, said deployment configuration comprising a script that describes a deployment strategy and wherein said deployment configuration defines multi-tiered deployments by chaining deployments from one tier to the next;
distributing and syndicating content based on content attributes by means of an intelligent delivery module, wherein said intelligent delivery module enables a base server to use content attributes for smart distribution and syndication wherein distributing and syndicating content based on content attributes by means of an intelligent delivery module comprises:
creating an offer, wherein an offer defines a content source and a metadata query for identifying relevant assets; and
creating a subscription, wherein a subscription completes deployment rules for an offer, including any of target nodes, schedule, and delivery mechanism by means of an offer/subscription management layer; and
making transactional content deployments and rolling them back in case of failure;
wherein said content is transactionally deployed across a plurality of computing devices.

46. The method of claim 45, further comprising a step of configuring said at least one sender to receive content deployed from another sender.

47. The method of claim 45, further comprising a step of pushing deployments from one node to another.

48. The method of claim 45, further comprising a step of pulling deployments from one node to another.

49. The method of claim 45, wherein said deployed content comprises any of:
- data files;
- database updates;
- markup code;
- media files; and
- application code.

50. The method of claim 45, further comprising a step of securing said connection by means of an authentication process that ensures that communication is with a known machine in a known manner and that data is received from the known machine without interception by a third party.

51. The method of claim 50, further comprising a step of configuring a receiver to listen on a specific port for connection from a firewall's specific IP (Internet Protocol) address.

52. The method of claim 51, further comprising a step of configuring a receiver to receive content only from a known, trusted source.

53. The method of claim 50, further comprising a step of securing said connection by a certificate-based authentication process.

54. The method of claim 45, further comprising a step of encrypting content deployed over said secure connection.

55. The method of claim 45, further comprising a step of accessing plurality of services included in said administration module by means of a user interface, said user interface including any of event-driven and command-line capabilities.

56. The method of claim 55, wherein said plurality of services includes at least one service for managing user rights and authentication.

57. The method of claim 56, wherein said system provides single sign-on capability, so that a user authenticates on said system using authentication credentials for an underlying operating system or user directory.

58. The method of claim 55, wherein said plurality of services includes:
- at least one service for managing deployments;
- at least one service for creating and viewing schedule entries for automated deployments;
- at least one service for any of viewing, editing and uploading deployment configurations;
- at least one service for viewing and managing base servers and receivers;
- at least one service for creating and running deployment report queries;
- at least one service for assigning access rights to base servers and receivers and restricting users rights to initiate deployments;
- at least one service for configuring database auto-synchronization; and
- managing syndicated content offers and subscriptions.

59. The method of claim 45, further comprising a step of providing event triggers for integrating external programs into a deployment, wherein external tasks are launched on source and/or target systems.

60. The method of claim 45, further comprising a step of invoking a payload adapter module at the start of a deployment for integrating a sender with an arbitrary source, wherein said payload adaptor prepares a payload of files to be returned to said sender from the source.

61. The method of claim 45, further comprising a step of invoking a delivery adaptor after files are deployed to a target, wherein said delivery adapter is invoked with a manifest of deployed files, and wherein said adapter processes said deployed files.

62. The method of claim 45, further comprising an interface for programmatic access to system services.

63. The method of claim 45, wherein said system is scalable to include multi-tiered development topologies including servers inside and outside of firewalls.

64. The method of claim 45, further comprising a step of distributing only incremental changes between a source and each target in a deployment.

65. The method of claim 45, wherein a sender is configured to deploy to multiple targets in parallel.

66. The method of claim 65, wherein said deployment configuration defines logical nodes and replication farms that are independent of a physical topology.

67. The method of claim 45, wherein said deployment configuration defines routed deployments by computing a route from a pre-defined set of route segments.

68. The method of claim 45, wherein said deployment configuration specifies rules for including and excluding files and directories.

69. The method of claim 45, wherein said deployment configuration specifies transfer rules to describe how data is to be handled during transfer.

70. The method of claim 45, wherein said deployment configuration specifies permission and ownership rules for deployed files and directories.

71. The method of claim 45, wherein said step of tracking and rolling back transactional deployments comprises steps of:
- defining a deployment by means of a deployment configuration, wherein said deployment configuration specifies that a deployment is transactional; and rolling back a deployment transaction by means of system services to restore each target to its last known good state in the event of failure.

72. The method of claim 71, wherein each leg of a parallel deployment is synchronized with all other legs.

73. The method of claim 71, wherein said deployment configuration specifies a quorum for a parallel deployment, wherein said quorum comprises a defined sub-set of a total number of targets.

74. The method of claim 73, further comprising a step of, if a deployment to the quorum succeeds, committing successful targets and rolling back failed targets.

75. The method of claim 45, further comprising a step of creating log files on sender and receiver systems by means of a logging facility.

76. The method of claim 75, further comprising a step of viewing said log files by means of a log viewer, said log viewer included in said logging facility.

77. The method of claim 45, further comprising any of the steps of: locking down command line invocations to specific hosts; and confining user authentication for the administration module to one or more specific access services.

78. The method of claim 45, further comprising a step of synchronizing automated deployments of content from a plurality of repositories.

79. The method of claim 45, further comprising a step of deploying data updates to relational databases by means of a data deployment module.

80. The method of claim 79, wherein said step of deploying data updates to relational databases comprises any of the steps of:
- specifying type and location of source files;
- specifying which schema mapping to use;
- specifying a target database.

81. The method of claim 79, wherein said step of deploying data updates to relational databases comprises any of the steps of:
  mapping document type definition to a target database schema; and
  creating a wrapper configuration.

82. The method of claim 79, wherein said step of deploying data updates to relational databases comprises a step of:
  synchronizing delivery of structured content to a target database with delivery of code and unstructured content file to multiple servers.

83. The method of claim 45, wherein said step of distributing and syndicating content based on content attributes by means of an intelligent delivery module comprises any of the steps of: specifying deployment criteria in the form of a metadata query; and providing a payload adapter that supports use of a JDBC-compliant database as a metadata repository.

84. The method of claim 45, further comprising a step of automating secure provisioning of web updates by means of a web change management hub.

85. The method of claim 84, wherein said step of automating secure provisioning of web updates by means of a web change management hub comprises any of the steps of: aggregating and coordinating change sets from multiple code and content repositories; aggregating code, content and configuration files that are ready to be provisioned into editions, wherein an edition is deployed to a target.

86. The method of claim 85, wherein an edition deploys incremental changes to a target server, and wherein said edition provides an efficient mechanism for recording current state of said target server at any time.

87. The method of claim 86, wherein said content deployment system rolls back said target server to a previous state based on said recorded current state by deploying files that differ between previous and current editions.

88. The method of claim 85, wherein an edition preserves accurate snapshots of a web application as it existed at specific points in time, so that audit requirements are satisfied.

\* \* \* \* \*